United States Patent
Ferguson

(10) Patent No.: US 8,397,059 B1
(45) Date of Patent: *Mar. 12, 2013

(54) METHODS AND APPARATUS FOR IMPLEMENTING AUTHENTICATION

(75) Inventor: JC Ferguson, Harvard, MA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/152,097

(22) Filed: Jun. 2, 2011

Related U.S. Application Data

(63) Continuation of application No. 11/346,415, filed on Feb. 2, 2006, now Pat. No. 7,958,347.

(60) Provisional application No. 60/650,201, filed on Feb. 4, 2005.

(51) Int. Cl.
- H04L 29/06 (2006.01)
- H04L 9/32 (2006.01)
- G06F 7/04 (2006.01)
- G06F 17/30 (2006.01)
- G06F 15/16 (2006.01)

(52) U.S. Cl. ............. 713/155; 713/168; 726/8; 726/12; 726/15

(58) Field of Classification Search .................. 713/155, 713/168; 726/8, 12, 15
See application file for complete search history.

(56) References Cited

U.S. PATENT DOCUMENTS

| | | | |
|---|---|---|---|
| 4,993,030 A | 2/1991 | Krakauer et al. | |
| 5,218,695 A | 6/1993 | Noveck et al. | |
| 5,303,368 A | 4/1994 | Kotaki | |
| 5,473,362 A | 12/1995 | Fitzgerald et al. | |
| 5,511,177 A | 4/1996 | Kagimasa et al. | |
| 5,537,585 A | 7/1996 | Blickenstaff et al. | |
| 5,548,724 A | 8/1996 | Akizawa et al. | |
| 5,550,965 A | 8/1996 | Gabbe et al. | |
| 5,583,995 A | 12/1996 | Gardner et al. | |
| 5,586,260 A | 12/1996 | Hu | |
| 5,590,320 A | 12/1996 | Maxey | |
| 5,649,194 A | 7/1997 | Miller et al. | |

(Continued)

FOREIGN PATENT DOCUMENTS

| | | |
|---|---|---|
| AU | 2003300350 A1 | 7/2004 |
| CA | 2512312 A1 | 7/2004 |

(Continued)

OTHER PUBLICATIONS

Aguilera, Marcos K. et al., "Improving recoverability in multi-tier storage systems," International Conference on Dependable Systems and Networks (DSN-2007), Jun. 2007, 10 pages, Edinburgh, Scotland.

(Continued)

*Primary Examiner* — Michael Simitoski
(74) *Attorney, Agent, or Firm* — LeClairRyan, a Professional Corporation

(57) ABSTRACT

A proxy (e.g., a switch) resides in a respective network environment between one or more clients and multiple servers. One purpose of the proxy is to provide the clients a unified view of a distributed file system having respective data stored amongst multiple remote and disparate storage locations over a network. Another purpose of the proxy is to enable the clients to retrieve data stored at the multiple servers. To establish a first connection between the proxy and a respective client, the proxy communicates with an authentication agent (residing at a location other than at the client) to verify a challenge response received from the client. When establishing a set of second connections with the multiple servers, the proxy communicates with the authentication agent to generate challenge responses on behalf of the client. The proxy facilitates a flow of data on the first connection and the set of second connections.

32 Claims, 9 Drawing Sheets

U.S. PATENT DOCUMENTS

| | | | |
|---|---|---|---|
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,937,406 A | 8/1999 | Balabine et al. |
| 5,999,664 A | 12/1999 | Mahoney et al. |
| 6,012,083 A | 1/2000 | Savitzky et al. |
| 6,029,168 A | 2/2000 | Frey |
| 6,044,367 A | 3/2000 | Wolff |
| 6,047,129 A | 4/2000 | Frye |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,202,156 B1 * | 3/2001 | Kalajan ............... 726/11 |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,282,610 B1 | 8/2001 | Bergsten |
| 6,289,345 B1 | 9/2001 | Yasue |
| 6,308,162 B1 | 10/2001 | Ouimet et al. |
| 6,324,581 B1 | 11/2001 | Xu et al. |
| 6,339,785 B1 | 1/2002 | Feigenbaum |
| 6,349,343 B1 | 2/2002 | Foody et al. |
| 6,374,263 B1 | 4/2002 | Bunger et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,601,101 B1 | 7/2003 | Lee et al. |
| 6,606,663 B1 * | 8/2003 | Liao et al. ............... 709/229 |
| 6,612,490 B1 | 9/2003 | Herrendoerfer et al. |
| 6,721,794 B2 | 4/2004 | Taylor et al. |
| 6,738,790 B1 | 5/2004 | Klein et al. |
| 6,742,035 B1 | 5/2004 | Zayas et al. |
| 6,748,420 B1 | 6/2004 | Quatrano et al. |
| 6,757,706 B1 | 6/2004 | Dong et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,871,245 B2 | 3/2005 | Bradley |
| 6,889,249 B2 | 5/2005 | Miloushev et al. |
| 6,922,688 B1 | 7/2005 | Frey, Jr. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,973,455 B1 | 12/2005 | Vahalia et al. |
| 6,973,549 B1 | 12/2005 | Testardi |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,003,533 B2 | 2/2006 | Noguchi et al. |
| 7,006,981 B2 | 2/2006 | Rose et al. |
| 7,010,553 B2 | 3/2006 | Chen et al. |
| 7,013,379 B1 | 3/2006 | Testardi |
| 7,020,644 B2 | 3/2006 | Jameson |
| 7,020,669 B2 | 3/2006 | McCann et al. |
| 7,024,427 B2 | 4/2006 | Bobbitt et al. |
| 7,051,112 B2 | 5/2006 | Dawson |
| 7,054,998 B2 | 5/2006 | Arnott et al. |
| 7,072,917 B2 | 7/2006 | Wong et al. |
| 7,089,286 B1 | 8/2006 | Malik |
| 7,111,115 B2 | 9/2006 | Peters et al. |
| 7,113,962 B1 | 9/2006 | Kee et al. |
| 7,120,728 B2 | 10/2006 | Krakirian et al. |
| 7,120,746 B2 | 10/2006 | Campbell et al. |
| 7,127,556 B2 | 10/2006 | Blumenau et al. |
| 7,133,967 B2 | 11/2006 | Fujie et al. |
| 7,143,146 B2 | 11/2006 | Nakatani et al. |
| 7,146,524 B2 | 12/2006 | Patel et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,194,579 B2 | 3/2007 | Robinson et al. |
| 7,234,074 B2 | 6/2007 | Cohn et al. |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |
| 7,343,351 B1 * | 3/2008 | Bishop et al. ............... 705/67 |
| 7,343,398 B1 * | 3/2008 | Lownsbrough ............... 709/218 |
| 7,346,664 B2 | 3/2008 | Wong et al. |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,440,982 B2 | 10/2008 | Lu et al. |
| 7,457,982 B2 | 11/2008 | Rajan |
| 7,467,158 B2 | 12/2008 | Marinescu |
| 7,475,146 B2 * | 1/2009 | Bazot et al. ............... 709/227 |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,624,109 B2 | 11/2009 | Testardi |
| 7,639,883 B2 | 12/2009 | Gill |
| 7,644,109 B2 | 1/2010 | Manley et al. |
| 7,653,699 B1 | 1/2010 | Colgrove et al. |
| 7,689,596 B2 | 3/2010 | Tsunoda |
| 7,694,082 B2 | 4/2010 | Golding et al. |
| 7,711,771 B2 | 5/2010 | Kirnos |
| 7,734,603 B1 | 6/2010 | McManis |
| 7,743,035 B2 | 6/2010 | Chen et al. |
| 7,752,294 B2 | 7/2010 | Meyer et al. |
| 7,769,711 B2 | 8/2010 | Srinivasan et al. |

| | | |
|---|---|---|
| 7,788,335 B2 | 8/2010 | Miloushev et al. |
| 7,793,342 B1* | 9/2010 | Ebrahimi et al. ............ 726/8 |
| 7,822,939 B1 | 10/2010 | Veprinsky et al. |
| 7,831,639 B1 | 11/2010 | Panchbudhe et al. |
| 7,836,493 B2* | 11/2010 | Xia et al. ............ 726/9 |
| 7,849,112 B2 | 12/2010 | Mane et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,913,053 B1 | 3/2011 | Newland |
| 7,953,701 B2 | 5/2011 | Okitsu et al. |
| 7,958,347 B1 | 6/2011 | Ferguson |
| 8,005,953 B2 | 8/2011 | Miloushev et al. |
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1 | 5/2002 | Bradley |
| 2002/0073105 A1 | 6/2002 | Noguchi et al. |
| 2002/0083118 A1 | 6/2002 | Sim |
| 2002/0087887 A1* | 7/2002 | Busam et al. ............ 713/201 |
| 2002/0120763 A1 | 8/2002 | Miloushev et al. |
| 2002/0133330 A1 | 9/2002 | Loisey et al. |
| 2002/0133491 A1 | 9/2002 | Sim et al. |
| 2002/0138502 A1 | 9/2002 | Gupta |
| 2002/0143909 A1* | 10/2002 | Botz et al. ............ 709/223 |
| 2002/0147630 A1 | 10/2002 | Rose et al. |
| 2002/0150253 A1 | 10/2002 | Brezak et al. |
| 2002/0156905 A1* | 10/2002 | Weissman ............ 709/229 |
| 2002/0161911 A1 | 10/2002 | Pinckney, III et al. |
| 2002/0188667 A1 | 12/2002 | Kirnos |
| 2003/0005280 A1* | 1/2003 | Bobde et al. ............ 713/150 |
| 2003/0009429 A1 | 1/2003 | Jameson |
| 2003/0012382 A1* | 1/2003 | Ferchichi et al. ............ 380/270 |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0061240 A1 | 3/2003 | McCann et al. |
| 2003/0065956 A1* | 4/2003 | Belapurkar et al. ............ 713/202 |
| 2003/0115218 A1 | 6/2003 | Bobbitt et al. |
| 2003/0115439 A1 | 6/2003 | Mahalingam et al. |
| 2003/0135514 A1 | 7/2003 | Patel et al. |
| 2003/0149781 A1 | 8/2003 | Yared et al. |
| 2003/0159072 A1 | 8/2003 | Bellinger et al. |
| 2003/0171978 A1 | 9/2003 | Jenkins et al. |
| 2003/0177364 A1* | 9/2003 | Walsh et al. ............ 713/182 |
| 2003/0177388 A1 | 9/2003 | Botz et al. |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0054777 A1 | 3/2004 | Ackaouy et al. |
| 2004/0098383 A1 | 5/2004 | Tabellion et al. |
| 2004/0098595 A1* | 5/2004 | Aupperle et al. ............ 713/185 |
| 2004/0133573 A1 | 7/2004 | Miloushev et al. |
| 2004/0133577 A1 | 7/2004 | Miloushev et al. |
| 2004/0133606 A1 | 7/2004 | Miloushev et al. |
| 2004/0133607 A1 | 7/2004 | Miloushev et al. |
| 2004/0133650 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0236798 A1 | 11/2004 | Srinivasan et al. |
| 2004/0267830 A1 | 12/2004 | Wong et al. |
| 2005/0021615 A1 | 1/2005 | Arnott et al. |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0114701 A1* | 5/2005 | Atkins et al. ............ 713/201 |
| 2005/0160161 A1* | 7/2005 | Barrett et al. ............ 709/223 |
| 2005/0187866 A1 | 8/2005 | Lee |
| 2005/0198501 A1* | 9/2005 | Andreev et al. ............ 713/168 |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0123062 A1 | 6/2006 | Bobbitt et al. |
| 2006/0161518 A1 | 7/2006 | Lacapra |
| 2006/0167838 A1 | 7/2006 | Lacapra |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0212746 A1 | 9/2006 | Amegadzie et al. |
| 2006/0224687 A1 | 10/2006 | Popkin et al. |
| 2006/0230265 A1 | 10/2006 | Krishna |
| 2006/0259949 A1 | 11/2006 | Schaefer et al. |
| 2006/0271598 A1 | 11/2006 | Wong et al. |
| 2006/0277225 A1 | 12/2006 | Mark et al. |
| 2006/0282471 A1 | 12/2006 | Mark et al. |
| 2007/0022121 A1 | 1/2007 | Bahar et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0088702 A1 | 4/2007 | Fridella et al. |
| 2007/0098284 A1 | 5/2007 | Sasaki et al. |
| 2007/0136308 A1 | 6/2007 | Tsirigotis et al. |
| 2007/0208748 A1 | 9/2007 | Li |
| 2007/0209075 A1 | 9/2007 | Coffman |
| 2007/0226331 A1 | 9/2007 | Srinivasan et al. |
| 2008/0046432 A1 | 2/2008 | Anderson et al. |
| 2008/0070575 A1 | 3/2008 | Claussen et al. |
| 2008/0104443 A1 | 5/2008 | Akutsu et al. |
| 2008/0209073 A1 | 8/2008 | Tang |
| 2008/0222223 A1 | 9/2008 | Srinivasan et al. |
| 2008/0243769 A1 | 10/2008 | Arbour et al. |
| 2008/0282047 A1 | 11/2008 | Arakawa et al. |
| 2009/0007162 A1 | 1/2009 | Sheehan |
| 2009/0037975 A1 | 2/2009 | Ishikawa et al. |
| 2009/0041230 A1 | 2/2009 | Williams |
| 2009/0055607 A1 | 2/2009 | Schack et al. |
| 2009/0077097 A1 | 3/2009 | Lacapra et al. |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0254592 A1 | 10/2009 | Marinov et al. |

FOREIGN PATENT DOCUMENTS

| | | |
|---|---|---|
| EP | 0 738 970 A1 | 10/1996 |
| JP | 63010250 A | 1/1988 |
| JP | 06-332782 | 12/1994 |
| JP | 08-328760 | 12/1996 |
| JP | 08-339355 | 12/1996 |
| JP | 9016510 A | 1/1997 |
| JP | 11282741 A | 10/1999 |
| NZ | 566291 A | 12/2008 |
| WO | WO 02/056181 A2 | 7/2002 |
| WO | WO 2004/061605 A2 | 7/2004 |
| WO | WO 2008/130983 A1 | 10/2008 |
| WO | WO 2008/147973 A2 | 12/2008 |

OTHER PUBLICATIONS

Anderson, Darrell C. et al., "Interposed Request Routing for Scalable Network Storage," ACM Transactions on Computer Systems 20(1): (Feb. 2002), pp. 1-24.

Anderson et al., "Serverless Network File System," in the 15th Symposium on Operating Systems Principles, Dec. 1995, Association for Computing Machinery, Inc.

Anonymous, "How DFS Works: Remote File Systems," Distributed File System (DFS) Technical Reference, retrieved from the Internet on Feb. 13, 2009: URL<:http://technetmicrosoft.com/en-us/library/cc782417WS.10,printer).aspx> (Mar. 2003).

Apple, Inc., "Mac OS X Tiger Keynote Intro. Part 2," Jun. 2004, www.youtube.com <http://www.youtube.com/watch?v=zSBJwEmRJbY>, p. 1.

Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.

"Auspex Storage Architecture Guide," Second Edition, 2001, Auspex Systems, Inc., www.auspex.com, last accessed on Dec. 30, 2002.

Basney, Jim et al., "Credential Wallets: A Classification of Credential Repositories Highlighting MyProxy," TPRC 2003, Sep. 19-21, 2003.

Botzum, Keys, "Single Sign on—A Contrarian View," Open Group Website, <http://www.opengroup.org/security/topics.htm>, Aug. 6, 2001, pp. 1-5.

Cabrera et al., "Swift: Storage Architecture for Large Objects," In Proceedings of the-Eleventh IEEE Symposium on Mass Storage Systems, pp. 123-128, Oct. 1991.

Cabrera et al., "Swift: Using Distributed Disk Striping to Provide High I/O Data Rates," Computing Systems 4, 4 (Fall 1991), pp. 405-436.

Cabrera et al., "Using Data Striping in a Local Area Network," 1992, technical report No. UCSC-CRL-92-09 of the Computer & Information Sciences Department of University of California at Santa Cruz.

Callaghan et al., "NFS Version 3 Protocol Specifications" (RFC 1813), Jun. 1995, The Internet Engineering Task Force (IETN), www.ietf.org, last accessed on Dec. 30, 2002.

Carns et al., "PVFS: A Parallel File System for Linux Clusters," in Proceedings of the Extreme Linux Track: 4th Annual Linux Showcase and Conference, pp. 317-327, Atlanta, Georgia, Oct. 2000, USENIX Association.

Cavale, M. R., "Introducing Microsoft Cluster Service (MSCS) in the Windows Server 2003", Microsoft Corporation, Nov. 2002.

"CSA Persistent File System Technology," Colorado Software Architecture, Inc.: A White Paper, Jan. 1, 1999, p. 1-3, <http://www.cosoa.com/white_papers/pfs.php>.

"Distributed File System: Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

English Translation of Notification of Reason(s) for Refusal for JP 2002-556371 (Dispatch Date: Jan. 22, 2007).

Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.

Farley, M., "Building Storage Networks," Jan. 2000, McGraw Hill, ISBN 0072120509.

Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.

Gibson et al., "NASD Scalable Storage Systems," Jun. 1999, USENIX99, Extreme Linux Workshop, Monterey, California.

Hartman, J., "The Zebra Striped Network File System," 1994, Ph.D. dissertation submitted in the Graduate Division of the University of California at Berkeley.

Haskin et al., "The Tiger Shark File System," 1996, in proceedings of IEEE, Spring COMPCON, Santa Clara, CA, www.research.ibm.com, last accessed on Dec. 30, 2002.

Hwang et al., "Designing SSI Clusters with Hierarchical Checkpointing and Single 1/0 Space," IEEE Concurrency, Jan.-Mar. 1999, pp. 60-69.

International Search Report for International Patent Application No. PCT/US2008/083117 (Jun. 23, 2009).

International Search Report for International Patent Application No. PCT/US2008/060449 (Apr. 9, 2008).

International Search Report for International Patent Application No. PCT/US2008/064677 (Sep. 6, 2009).

International Search Report for International Patent Application No. PCT/US02/00720, (Jul. 8, 2004).

International Search Report from International Application No. PCT/US03/41202, (Sep. 15, 2005).

Karamanolis, C. et al., "An Architecture for Scalable and Manageable File Services," HPL-2001-173, Jul. 26, 2001. p. 1-114.

Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.

Kimball, C.E. et al., "Automated Client-Side Integration of Distributed Application Servers," 13Th LISA Conf., 1999, pp. 275-282 of the Proceedings.

Kohl et al., "The Kerberos Network Authentication Service (V5)," RFC 1510, Sep. 1993. (http://www.ietf.org/rfc/rfc1510.txt?number=1510).

Long et al., "Swift/RAID: A distributed RAID System", Computing Systems, Summer 1994, vol. 7, pp. 333-359.

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.

Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.

Norton et al., "CIFS Protocol Version CIFS-Spec 0.9," 2001, Storage Networking Industry Association (SNIA), www.snia.org, last accessed on Mar. 26, 2001.

Novotny, Jason et al., "An Online Credential Repository for the Grid: MyProxy," 2001, IEEE.

Pashalidis, Andreas et al., "A Taxonomy of Single Sign-On Systems," 2003.

Pashalidis, Andreas et al., "Impostor: a single sign-on system for use from untrusted devices," 2004.

Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings," Comm. of the ACM, Jun. 1990, vol. 33, No. 6.

Peterson, M., "Introducing Storage Area Networks," Feb. 1998, InfoStor, www.infostor.com, last accessed on Dec. 20, 2002.

Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.

Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph -p. 868, col. 1, paragraph 1.

RSYNC, "Welcome to the RSYNC Web Pages," Retrieved from the Internet URL: http://samba.anu.edu.ut.rsync/. (Retrieved on Dec. 18, 2009).

Savage, et al., "AFRAID—a Frequently Redundant Array of Independent Disks," 1996 USENIX Technical Conf., San Diego, California, Jan. 22-26, 1996.

"Scaling Next Generation Web Infrastructure with Content-Intelligent Switching: White Paper," Apr. 2000, p. 1-9 Alteon Web Systems, Inc.,.

Soltis et al., "The Design and Performance of a Shared Disk File System for IRIX," in Sixth NASA Goddard Space Flight Center Conference on Mass Storage and Technologies in cooperation with the Fifteenth IEEE Symposium on Mass Storage Systems, Mar. 23-26, 1998.

Sorenson, K.M., "Installation and Administration: Kimberlite Cluster Version 1.1.0, Rev. Dec. 2000," Mission Critical Linux, http://oss.missioncriticallinux.corn/kimberlite/kimberlite.pdf.

Stakutis, C., "Benefits of SAN-based file system sharing," Jul. 2000, InfoStor, www.infostor.com, last accessed on Dec. 30, 2002.

"The AFS File System in Distributed Computing Environment," www.transarc.ibm.com/Library/whitepapers/AFS/afsoverview.html, last accessed on Dec. 20, 2002.

Thekkath et al., "Frangipani: A Scalable Distributed File System," in Proceedings of the 16th ACM Symposium on Operating Systems Principles, Oct. 1997, Association for Computing Machinery, Inc.

Tulloch, Mitch, "Microsoft Encyclopedia of Security," 2003, pp. 218, 300-301.

"Veritas SANPoint Foundation Suite(tm) and SANPoint Foundation Suite(tm) HA: New VERITAS Volume Management and File System Technology for Cluster Environments," Sep. 2001, VERITAS Software Corp.

Wilkes, J., et al., "The HP AutoRAID Hierarchical Storage System," ACM Transactions on Computer Systems, Feb. 1996, vol. 14, No. 1.

"Windows Clustering Technologies-An Overview," Nov. 2001, Microsoft Corp., www.microsoft.com, last accessed on Dec. 30, 2002.

Zayas, E., "AFS-3 Programmer's Reference: Architectural Overview," Transarc Corp., version 1.0 of Sep. 2, 1991, doc. No. FS-00-D160.

English Language Abstract of JP 08-328760 from Patent Abstracts of Japan.

English Language Abstract of JP 08-339355 from Patent Abstracts of Japan.

English Translation of paragraphs 17, 32, and 40-52 of JP 08-328760.

Harrison, C., May 19, 2008 response to Communication pursuant to Article 96(2) EPC dated Nov. 9, 2007 in corresponding European patent application No. 02718824.2.

Hu, J., Final Office action dated Sep. 21, 2007 for related U.S. Appl. No. 10/336,784.

Hu, J., Office action dated Feb. 6, 2007 for related U.S. Appl. No. 10/336,784.

Klayman, J., Nov. 13, 2008 e-mail to Japanese associate including instructions for response to office action dated May 26, 2008 in corresponding Japanese patent application No. 2002-556371.

Klayman, J., response filed by Japanese associate to office action dated Jan. 22, 2007 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Korkuzas, V., Communication pursuant to Article 96(2) EPC dated Sep. 11, 2007 in corresponding European patent application No. 02718824.2-2201.

Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.

Response filed Jul. 6, 2007 to Office action dated Feb. 6, 2007 for related U.S. Appl. No. 10/336,784.

Response filed Mar. 20, 2008 to Final Office action dated Sep. 21, 2007 for related U.S. Appl. No. 10/336,784.

Soltis et al., "The Global File System," in Proceedings of the Fifth NASA Goddard Space Flight Center Conference on Mass Storage Systems and Technologies, Sep. 17-19, 1996, College Park, Maryland.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

* cited by examiner

METHODS AND APPARATUS FOR IMPLEMENTING AUTHENTICATION

RELATED APPLICATIONS

This application is a continuation of U.S. application Ser. No. 11/346,415, filed Feb. 2, 2006, which claims the benefit of U.S. Provisional Application No. 60/650,201, filed Feb. 4, 2005, the entire disclosures of which are hereby incorporated by reference.

BACKGROUND

In general, authentication is a process of determining whether someone is who they claim to be. In the computer industry, authentication is commonly performed via use of logon passwords. Knowledge of the password is assumed to guarantee a user is authentic. In many applications, each user initially registers (or is registered by someone else) using an assigned or self-declared password. On each subsequent use of a computer, the user must know and use the previously declared password in order to log onto a computer and use a respective network. For security reasons, passwords are generally not transmitted over a network in raw form. Instead, hashing functions are applied to passwords (provided by the user) prior to transmission over a respective network.

One type of authentication protocol is known as NTLM (e.g., Windows™ NT LAN Manager). In general, the NTLM authentication protocol involves a series of communications with a user attempting to use a respective network.

According to the NTLM authentication protocol, a client initially sends a respective server a Negotiate CIFS protocol request message. In the header of this CIFS message is a bit-mask indicating the client's capabilities, such as authentication methods supported by the client.

In response to receiving the CIFS NegProt_Request message, the server chooses a CIFS dialect for future communications based on the list presented in the NegProt_Request message. If the negotiated authentication scheme is NTLM, the server receiving the NegProt_Request message includes an 8-byte "challenge" in the NegProt_Response message.

Upon receipt of the challenge message from the server, the client encrypts the 8-byte challenge value using a derivation of a user provided password (e.g., an encryption key that is an MD4 hash of the password that is turned into a DES key). The result is a 24-byte challenge "response." The challenge response is encoded into the SessionSetup CIFS message sent to the server.

Upon receipt of the challenge response from the client, the server performs the same computation (e.g., encryption of the 8-byte challenge) the client performed using a password hash function associated with the client. The password hash function used by the server is stored in a so-called Windows SAM database. If the result generated by the server matches encrypted value received from the client, the server returns an authentication-success message to the client allowing a respective connection. the server communicates with a domain controller of the respective network using the NetLogon Microsoft RPC protocol for purposes of authenticating a respective client. If authentication is successful in this last step. the client is cleared to send file operations to the server.

In addition to conventional NTLM techniques as discussed above, a so-called Kerberos V5 authentication model discloses a way for a client to delegate the authority for an intermediary system (e.g., another computer) to perform authentication on behalf of the client. This makes it possible to allow one's identity to flow through a multi-tier system where decisions about authority can be made in the originating identity at each tier. For example, if a user "JC" connects to machine "A," through delegation, machine "A" can be granted the authority to authenticate a session to an application on machine "B" as user "JC." Thus, on machine "B,"

access control is applied in the context of user "JC" rather than the context of machine "A."

SUMMARY

Conventional mechanisms such as those explained above suffer from a variety of shortcomings According to the Kerberos authentication model as discussed above, a proxy is delegated the authority to establish a downstream connection to a target device using the information (e.g., username) associated with the client delegating the authority to the proxy. Accordingly, the proxy is able to establish a connection with a target server based on use of information from the client. After performing an authentication according to the Kerberos model between the client and proxy and between the proxy and the target server, the client computer is able to communicate with the target device thru the proxy computer.

The conventional NTLM (Windows NT LAN Management) protocol lends itself to applications in which the client authenticates a direct communication link between the client and a target device. However, there is no provision in the conventional NTLM protocol to authenticate tandem communication links (e.g., successive CIFS connections) in a local area network environment connecting a client to a respective target device.

In contradistinction to the techniques discussed above as well as additional techniques known in the prior art, embodiments discussed herein include novel techniques associated with implementing authentication in a respective network environment. For example, embodiments herein are directed to a proxy device (e.g., a switch) residing in a respective network environment between one or more clients and multiple servers (e.g., a distributed storage system). One purpose of the proxy device is to provide one or more respective clients a unified view of a distributed file system having respective resources spread amongst multiple storage locations in a network. Accordingly, clients can connect to the proxy and view data information available from the multiple servers such as backend filers, file systems, etc.

In one embodiment, the proxy device manages the distributed data and enables the clients to access information from the multiple servers through the proxy device. That is, a client directly communicates with the proxy device via a first authenticated communication link; the proxy device also accesses data stored in the distributed file system (e.g., backend filers, storage systems, etc.) on behalf of the client via a corresponding set of authenticated links between the proxy device and the multiple servers.

More specifically, according to one embodiment herein, the proxy device enables the clients to establish connections with the proxy. However, the proxy terminates a respective client's CIFS TCP connection and negotiates a new CIFS dialect/session to each of multiple remote target locations (e.g., backend filers, servers, etc.) on behalf of the respective client. As discussed above, the connections between the proxy and multiple servers enables the proxy to access corresponding stored data in the multiple servers on behalf of the clients. Unfortunately, the proxy device needs access to the clients' password information so the proxy device is able to establish the connection between the client and the proxy device as well as establish similar types of connections between the proxy device and each of multiple servers.

For example, according to an embodiment herein, when the proxy attempts to establish a connection between the client and the proxy, the proxy must be able to verify the client is authentic. That is, the proxy must be able to verify that a client provides appropriate password information for a given username in order to establish respective connections or communication links (on behalf of the client) with the multiple servers.

One way of authenticating the client without sending password information over a respective network is to generate a "challenge" to the client. In this case, however, the proxy initiates forwarding the challenge to the client. The challenge includes a numerical value (e.g., an 8-byte value generated by a random number generator) sent to the client. In response to the challenge, the client sends a first encrypted value (e.g., a 24 byte value) of the 8-byte value back to the proxy. For example, in one embodiment, the client generates the 24-byte challenge response by applying a password hash key (e.g., a 3DES key generated by applying an MD4 algorithm to a plain text password provided by a user) to the numerical value in the challenge. To verify authorization of the client, the proxy forwards i) the numerical value associated with the challenge, ii) the client's username, and iii) the encrypted value (e.g., the 24-byte challenge response) received from the client in response to the challenge to a source (e.g., an authentication agent) that resides in the respective network at a location other than at the client. In one embodiment, the source is an authentication agent residing at a domain controller associated with a respective network. The domain controller stores username and corresponding password information associated with the respective network environment.

Upon receiving the i) the numerical value associated with the challenge, ii) the client's username, and iii) the encrypted value (e.g., the 24-byte challenge response) from the proxy, the authentication agent retrieves a password hash key associated with the client, applies the password hash key to the numerical value (received from the proxy) to produce a second encrypted value, and determines whether the 24-byte challenge response (e.g., the first encrypted value) provided by the client matches the second encrypted value generated by the authentication agent. If so, the authentication agent determines that the client is authentic. Based on the comparison, the authentication agent notifies the proxy whether the client (e.g., the user) has been authenticated and whether the proxy can allow the connection (e.g., communication link) between the proxy and the client.

As mentioned, the authentication agent performing the "compare" function can be a secured agent. For example, in such an embodiment, the proxy communicates with the authentication agent over a respective network via a secured link.

The authentication agent can maintain password hash key information associated with users of a respective network based on communications with the domain controller. For example, in one embodiment, the authentication agent periodically (or occasionally) receives a memory dump from the domain controller including usernames and corresponding password hash keys. Thus, for purposes of verifying authentication of the client, the secured agent can retrieve respective password hash key associated with the client (e.g., a user attempting to access stored data) and initiate the steps as discussed above to verify the challenge response provided to the proxy by the client.

According to further embodiments herein, in addition to or in lieu of the verification process discussed above, the secured agent is also able to act on behalf of the respective client and establish individual sessions between the proxy and each of multiple servers and/or backend storage systems. For example, to establish a connection (a.k.a., a session) with a given one of the multiple servers, the proxy generates and forwards a message (e.g., an NTLM negotiate protocol request) to the server for purposes of requesting a connection on behalf of the client. The server replies to the proxy with an authentication challenge including a random 8-byte numerical value generated by the server. The proxy responds to the challenge without communicating again with the client.

For example, according to one embodiment, the proxy communicates the 8-byte challenge received from the server to the authentication agent. The authentication agent obtains (from its own local memory or storage) the respective password hash key associated with the username for which the connection is being established and applies the password hash key to the 8-byte numerical value received from the server to produce an encrypted value. The authentication agent forwards the encrypted value to the proxy. The proxy, in turn, forwards the encrypted value to the server in response to the challenge. The server, in turn, communicates with the domain controller to verify that the proxy, acting on behalf of the client, is able to establish the connection with the server. In other words, the server forwards the encrypted value to the domain controller. The domain controller then verifies whether the encrypted value forwarded by the server matches the encrypted value that the proxy should have generated in response to the challenge. If there is an appropriate match, the proxy is authenticated and the server is allowed to notify (e.g., via an NTLM session setup response) the proxy that the session or connection can be established. Note that according to one embodiment, the proxy can setup multiple sessions over a single so-called TCP connection.

The proxy can repeat the above procedure for each link to the multiple servers (e.g., backend filers) in order to establish and authenticate connections (i.e., sessions) with each of the multiple servers. Accordingly, a client connects to the proxy via a first connection and the proxy connects to the multiple servers via a set of multiple second connections.

Embodiments described herein are useful in the context of proxy authentication. For example, a proxy switch according to embodiments herein needs to proxy a user's identity (e.g., a username) to potentially more than one backend filer. Since the proxy switch herein terminates a client's CIFS session, there is a need to create a new TCP connection and negotiate a new CIFS dialect/session to each backend filer on behalf of the client. In certain embodiments, the proxy switch herein establishes two sessions to a backend filer such as one from the NSM (data plane) to the backend filer and one from the ASM (control plane) to the backend filer, and so on. For each backend filer connection, a NegProt_Request and NegProt_Response exchange takes place. That is, the proxy switch herein attempts to establish a respective connection between the proxy and a first backend filer as well as between the proxy and a second backend filer. During each negotiate protocol request, a respective backend filer sends a different challenge value to the proxy switch. To respond to each challenge, the proxy switch needs the password hash key associated with a respective user for which the connection is being established for authentication purposes. This information is available from a domain controller that stores username and corresponding password hash key information.

One solution for supporting proxy authentication is to create a static database in the proxy switch to store user names and passwords in lieu of using a remote authentication agent as discussed above. In such a case, the proxy switch could use the information to appropriately respond to the backend filers generating the unique challenge values. Such a static database could be configured on the proxy switch using a respective CLI (Command Line Interface). An administrator would manually enter usernames and passwords.

However, this solution may not scale for larger customers who manage many user accounts. For example, assume that a large customer had to manage 35,000 accounts in their Windows Domain. Using the above-mentioned statically configured NTLM authentication database, the large customer would have to painstakingly enter every user (e.g., 35K users in this example) in their domain into an NTLM authentication database via the CLI. The database would have to be manually updated each time a user updated his/her password. The earlier discussed embodiments of using a remote authentication agent solve this scalability problem because username and password information is automatically and periodically dumped for storage at a respective authentication agent that handles verify and compare operations on behalf of the proxy for authentication purposes. Thus, earlier embodiments eliminate the need for manual updating of information. Also, the authentication agent as discussed above can be located at any location in a respective network even at the proxy switch, although a usual place for the authentication agent is at the domain controller.

Note that techniques herein are well suited for use in applications in which a proxy initiates authentication of a respective client and establishment of connections for communicating messages. However, it should be noted that configurations herein are not limited to use in such applications and thus configurations herein and deviations thereof are well suited for other applications as well.

In addition to the techniques discussed above, example embodiments herein also include one or more computerized devices configured to support proxy authentication and related services. According to such embodiments, the computerized device includes a memory system, a processor (e.g., a processing device), and an interconnect. The interconnect supports communications among the processor and the memory system. The memory system is encoded with an application that, when executed on the processor, produces a process to support proxy authentication technology and related services as discussed herein.

Yet other embodiments of the present application disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to support proxy authentication and related techniques as further explained herein. The computer program logic, when executed on at least one processor with a computing system, causes the processor to perform the operations (e.g., the methods) indicated herein as embodiments of the present application. Such arrangements of the present application are typically provided as software, code and/or other data structures arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One particular embodiment of the present application is directed to a computer program product that includes a computer readable medium having instructions stored thereon to support proxy authentication and related services. The instructions, when carried out by a processor of a respective first router (e.g., a computer device), cause the processor to perform the steps of: i) engaging in a first set of communications to establish a first communication link with a client; ii) engaging in a second set of communications to obtain and/or utilize security information associated with the client from a resource other than the client for purposes of establishing a set of second communication links with multiple servers on behalf of the client; and iii) facilitating a flow of traffic between the first communication link and the set of second communication links to enable the client to access information from the multiple servers. Other embodiments of the present application include software programs to perform any of the method embodiment steps and operations summarized above and disclosed in detail below.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Acopia Networks, Inc. of Lowell, Mass.

BRIEF DESCRIPTION OF THE DRAWINGS

The foregoing and other objects, features and advantages of the invention are apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

According to embodiments herein, at least one proxy (e.g., a switch) resides in a respective network environment between one or more clients and multiple servers. One purpose of the proxy (or multiple proxies as the case may be) is to provide the clients a unified view of a distributed file system having respective data stored amongst multiple remote and disparate storage locations over a network. The proxy can manage the distributed file system. Another purpose of the proxy is to enable the clients to retrieve data stored at the multiple servers. As discussed above, according to conventional methods, a client communicates directly with a server that authenticates the client for purposes of enabling the client to access data in the server. Adding the proxy according to embodiments herein requires providing a different authentication procedure to authenticate clients. However, use of the proxy eliminates a need for the client to directly communicate and establish links with multiple servers because the proxy handles such communication on behalf of the client.

To establish a (first) connection between the proxy and a respective client, the proxy communicates with an authentication agent (residing at a location other than at the client such as in a network domain controller) to verify a challenge response received from the client. Further downstream, when establishing a set of (second) connections between the proxy and the multiple servers, the proxy communicates with the authentication agent to generate challenge responses on behalf of the client. After authenticating and establishing the first connection and set of second connections, the proxy facilitates a flow of data on the first connection and the set of second connections to enable an authenticated client to access information from the multiple servers.

Figure 1:
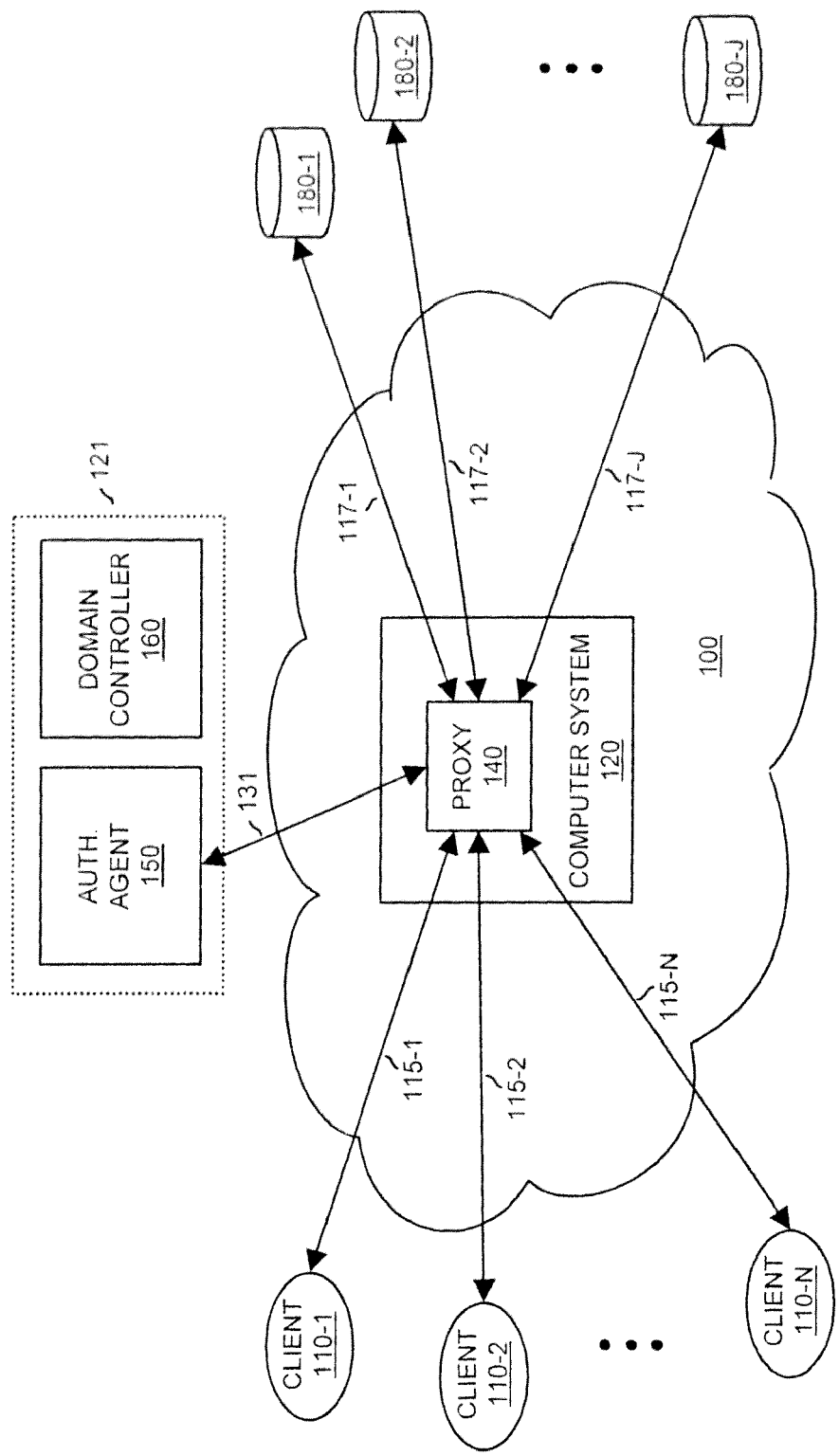
FIG. 1 is a diagram of a respective network environment supporting proxy authentication according to an embodiment herein.

FIG. 1 is a diagram of a network environment 100 (e.g., a communication system such as a local or wide area network, intranet, internet, etc.) in which computer system 120 includes proxy 140 supporting authentication according to an embodiment herein. Note that computer system 120 can be any type of data communication device that supports communication of data in a network between entities such as clients 110 and storage systems 180.

As shown, network environment 100 includes client 110-1, client 110-2, . . . , client 110-N (collectively, clients 110), computer system 120, computer system 121, storage system 180-1, storage system 180-2, . . . , storage system 180-J (collectively, storage systems 180), authentication agent 150, and domain controller 160. Computer system 120 executes proxy 140. Computer system 121 executes authentication agent 150 and domain controller 160.

Connection 115-1 connects clients 110 to proxy 140. Connection 115-2 connects client 110-2 to proxy 140. Connection 115-N connects client 110-N to proxy 140. Connection 117-1 connects proxy 140 to storage systems 180. Connection 117-2 connects proxy 140 to storage system 180-2. Connection 117-J connects proxy 140 to storage system 180-J. Based on such connectivity, client 110-1 can communicate through proxy 140 for purposes of viewing data stored at storage system 180-1 and 180-2. Thus, embodiments herein support point-to-multipoint as well as any other kind of connectivity between one or more clients 110 and one or more servers (e.g., storage system 180).

Note that the configuration of network environment 100 shown in FIG. 1 is merely an example for purposes of illustrating techniques according to embodiments herein. For example, network environment 100 can include many more different combinations of proxies, connections, clients, storage systems, etc. than the example embodiment shown in FIG. 1. Authentication agent 150 can operate on domain controller 160. Also, in alternative embodiments, note that authentication agent 150 and domain controller 160 need not operate on the same computer system 121. For example, authentication agent 150 can alternatively reside in other locations such as on computer system 120 alone with proxy 140, servers associated with storage system 180, etc. Thus, according to one embodiment herein, techniques herein include some sort of method to obtain usernames and password hashes from a particular domain controller (and corresponding SAM database) to an agent instance on a non-domain controller computer.

As mentioned above, embodiments herein are directed to a proxy 140 (e.g., a switch, network manager, etc.) residing in a respective network environment 100 between one or more clients 110 and multiple servers associated with storage systems 180 (e.g., a distributed storage system). As discussed above, one purpose of the proxy 140 is to provide one or more respective clients 110 a unified view of a distributed file system having respective resources (e.g., data, files, etc.) spread amongst disparately located storage systems 180 in network environment 100. In other words, proxy can manage a hierarchical tree of data stored in storage systems 180 and present the hierarchical tree to a client for choosing which data to retrieve from the storage systems 180. Accordingly, each client 110 can connect to the proxy 140 and view data information available from the multiple servers such as backend filers, files systems, etc. Note that the storage systems 180 can enforce access control lists indicating which clients are able to retrieve and view corresponding stored data.

In one embodiment, the proxy 140 manages the distributed data associated with network environment 100 and enables the clients 110 to access information in storage system 180. As mentioned, each of the storage systems 180 can include a corresponding one or more servers that facilitate access to data stored in storage system 180. That is, a respective client in network environment 100 directly communicates with the proxy 140 via a first authenticated communication connection 115 (a.k.a., a communication link for purposes of this disclosure). The proxy 140 connects to the storage systems 180 via additional authenticated connections 117 (a.k.a., communication links for purposes of this disclosure) on behalf of the client and/or clients to access corresponding data stored in the distributed file system (e.g., backend filers, storage systems, etc.).

More specifically, the proxy 140 enables the clients 110 to establish connections 115 with the proxy 140. However, according to embodiments herein, the proxy 140 terminates a respective client's connection 115 (e.g., a CIFS TCP connection) and negotiates one or more new connections 117 (e.g., CIFS dialect/session) to each of multiple remote target locations (e.g., storage system 180) on behalf of the respective client. As discussed above, the connections 117 between the proxy 140 and multiple storage systems 180 (e.g., servers) enable the proxy 140 to access corresponding stored data in the multiple storage system 180 on behalf of the clients 110.

In one embodiment, each of the connections 115 and connections 117 are authenticated and utilized on a per user basis. In other words, according to one embodiment, each of connections 115 and connections 117 is dedicated for use by a particular authenticated client. Consequently, at any given time, proxy 140 can establish many different connections 117 (e.g., one per each respective user) from computer system 120 to a respective server so that multiple clients can send file operations to the same server or storage system 180.

According to a conventional technique as mentioned above, the clients 110 can establish a connection directly with the storage system 180 without use of proxy 140 via use of the conventional NTLM protocol. Unfortunately, the conventional NTLM protocol does not lend itself for use in a proxy mode in which the proxy 140 has access to information in the domain controller 160. According to embodiments herein, the proxy 140 needs access to the clients' password information so that the proxy 140 is able to establish a connection 115-1 between the client 110-1 and the proxy 140 as well as establish similar types of connections 117 between the proxy 140 and each of multiple storage system 180. Based on techniques herein, proxy 140 is transparent to the user because the client uses the same protocol to connect with the proxy 140 as the client would otherwise use to connect directly with a respective server or storage system 180.

When the proxy 140 attempts to establish a connection 115-1 between the client 110-1 and the proxy 140, the proxy 140 must be able to verify that the client 110-1 is authentic. This could appropriately be named a "verification" procedure. In this procedure, the proxy 140 must be able to verify that, during a connection negotiation process utilizing an NTLM-like protocol, the client 110-1 provides the appropriate password information for a given username in order to establish a connection 115. The proxy 140 also must be able to act on behalf of the client to establish connections 117 with corresponding storage systems 180.

In the context of the present example, one way of authenticating the client 110-1 without sending password information over a respective network is to generate a challenge from the proxy 140 to the client 110-1. The challenge includes a numerical value (e.g., an 8-byte value generated by a random number generator) sent to the client 110-1. The random numerical value can be generated by a source such as the proxy 140 or authentication agent 150.

In response to the challenge, the client 110-1 sends a first encrypted value (e.g., a 24-byte value) of the 8-byte value back to the proxy 140. For example, in one embodiment, the client 110-1 generates a 24-byte challenge response by applying a password hash key (e.g., a 3DES key generated by applying an MD4 algorithm to a plain text password provided by the client 110-1) to the numerical value in the challenge value received from the proxy 140.

To verify the authentication of the client 110-1 (e.g., a user attempting to mount a file system stored in storage systems 180), the proxy 140 forwards i) the numerical value associated with the challenge, ii) the client's username, and iii) the encrypted value (e.g., the 24-byte challenge response received from the client 110-1 in response to the challenge) to authentication agent 150 over connection 131 (e.g., a secured communication link in which communications are encrypted for security reasons) to the authentication agent 150.

Authentication agent 150 (e.g., a processing function) resides in the respective network environment 100 at a location other than at client 110-1. For example, according to one embodiment, the authentication agent 150 is an independently operating secured agent residing and/or being executed by the domain controller 160. Among other things, the domain controller 160 manages password information and corresponding usernames associated with persons authorized to use network environment 100. The domain controller 160 oversees which clients 110 in network environment 100 are allowed to establish communication sessions (e.g., connections) and retrieve information from storage systems 180.

Upon receiving i) the numerical value associated with the challenge, ii) the client's username, and iii) the encrypted value (e.g., the 24-byte challenge response from the client 110-1) from the proxy 140, the authentication agent 150 retrieves a password hash key associated with the client 110-1 based on a previous dumping of password and username information from the domain controller 160 to the authentication agent 150.

The authentication agent 150 applies the appropriate password hash key to the numerical value (received from the proxy 140) to produce a second encrypted value. The authentication agent 150 performs a compare function to determine whether the 24-byte challenge response (e.g., the first encrypted value) provided by the client 110-1 matches the second encrypted value generated by the authentication agent 150. If there is a match, the authentication agent 150 determines that the client is authentic. Effectively, the authentication agent 150 identifies whether a user (e.g., client 110-1) provides the appropriate password information for establishing connections 115 and 117. After applying the compare function, the authentication agent 150 notifies the proxy 140 whether the client (e.g., the user) has been authenticated (e.g., provides the appropriate response to the challenge) and whether the proxy 140 can allow the connection 115-1 between the proxy 140 and the client 110-1.

As mentioned, the authentication agent 150 performing the "compare" function can be a secured agent. For example, in such an embodiment, the proxy 140 utilizes encryption techniques to communicate with the authentication agent 150 over connection 131. In a reverse direction, the authentication agent 150 encrypts corresponding messages sent over connection 131 to proxy 140.

Figure 2:
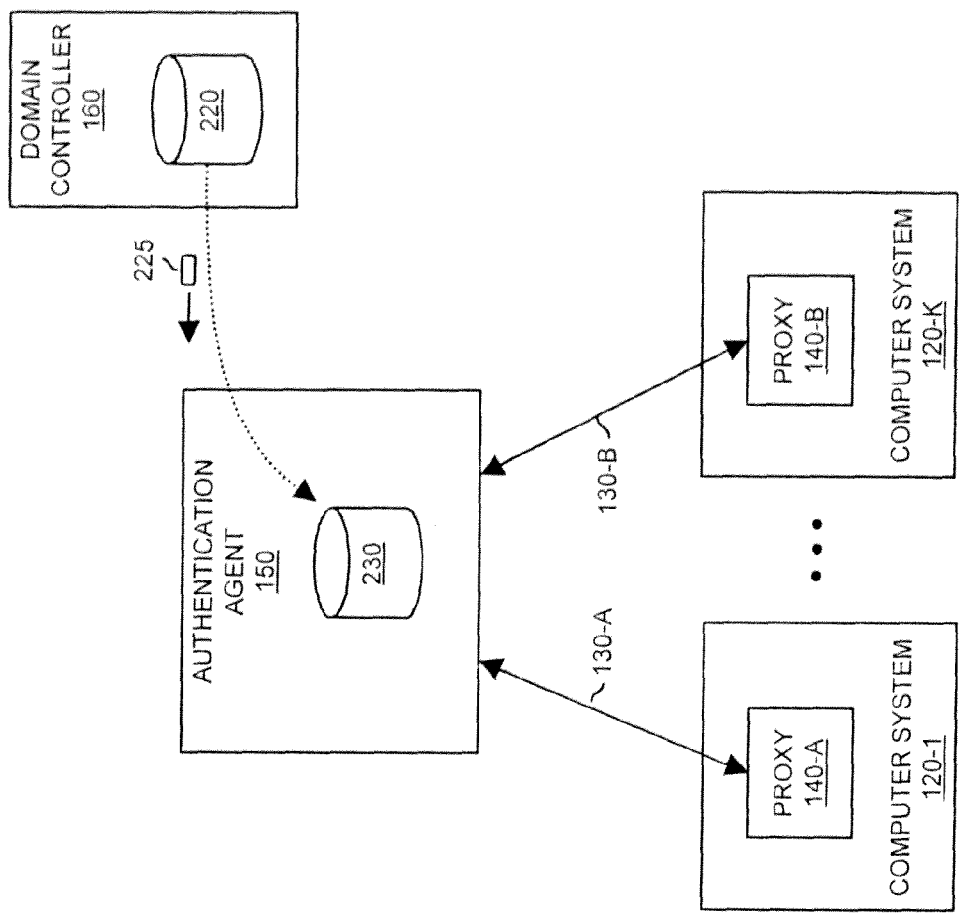
FIG. 2 is a diagram illustrating downloading of information from a domain controller to an authentication agent according to an embodiment herein.

As discussed briefly above, the authentication agent 150 can maintain password information (i.e., password hash key information) associated with users authorized to use network environment 100. FIG. 2 is a diagram more specifically illustrating how domain controller 160 forwards such information to authentication agent 150 according to an embodiment herein. For example, using a tool such as pwdump.exe, authentication agent 150 periodically or occasionally (e.g., every few minutes or so) receives a memory dump 225 from the domain controller 160. The memory dump 225 can include a text string of usernames and corresponding password hash key information (e.g., MD4 password hash key information). The authentication agent 150 parses the text string and stores the username and password information in storage 230 (e.g., memory, disk, etc.). Thus, for purposes of verifying authentication of a user such as client 110-1, the authentication agent 150 can retrieve a respective password hash key from memory 230 associated with the client 110-1 and initiate the steps (e.g., generation of an encrypted value and comparison) as discussed above to verify the challenge response provided to the proxy 140 by the client 110-1.

Note that authentication agent 150 herein is not limited to communicating with only a single proxy. For example, as shown, the authentication agent 150 can execute a separate processing thread for each of multiple proxies 140 operating in network environment 100. In the context of such an example, authentication agent 150 executes a first thread to manage communications over connection 130-A to proxy 140-A; authentication agent 150 executes a second thread to manage communications over connection 130-B to proxy 140-B, and so on. Thus, authentication agent 150 initiates execution of individual processing threads for each proxy 140. Accordingly, authentication agent 150 can more quickly authenticate connections on behalf of one or more respective proxies 140. As discussed above, messages sent over the connections 130 (e.g., connection 130-A, connection 130-B, etc.) can be encrypted for security reasons.

Referring again to FIG. 1, in addition to or in lieu of the verification process discussed above for authenticating connections 115 between clients 110 and the proxy 140, the authentication agent 150 can act on behalf of the respective clients 110 and establish individual connection sessions between the proxy 140 and each of multiple servers or storage systems 180. This can appropriately be called a "create challenge response" procedure. According to this embodiment and procedure, to establish a connection 117 with a given one of the multiple servers or storage systems 180, the proxy 140 generates and forwards a message (e.g., an NTLM negotiate protocol request) to a server or storage system 180 for purposes of requesting and establishing a connection 117 on behalf of a client. In response to receiving an NTLM negotiate protocol request (or NTLM-like negotiate protocol request) from the proxy 140, the server or storage system 180 replies to the proxy 140 with an authentication challenge (e.g., a negotiate protocol response) including a random 8-byte numerical value generated by the server or storage system 180.

The proxy 140 can respond to the challenge from the server or storage system 180 without having to communicate again with the client 110. For example, according to one embodiment, the proxy communicates the 8-byte challenge received from the server or storage system 180 as well as a username associated with the client 110-1 to the authentication agent 150. As discussed above, the authentication agent 150 stores username and corresponding password information. In this example, the proxy 140 need only provide the authentication agent 150 the username of the client 110-1 to obtain password information.

Based on stored information, the authentication agent 150 obtains the respective password hash key associated with the client 110-1 (e.g., username) for which the connection is being established and applies the password hash key to the 8-byte numerical value received from the proxy 140 to produce an encrypted value. In a particular embodiment, the encrypted value is 24 bytes in length if the authentication agent 150 was able to successfully generate a challenge response and 4 bytes in length indicating a respective error code if the authentication agent 150 is unable to generate a proper challenge response.

The authentication agent 150 forwards the encrypted value (e.g., challenge response) to the proxy 140. The proxy 140, in turn, replies to the challenge received from the server or storage system 180 by forwarding the encrypted challenge response value (as generated by the authentication agent 150) to the server or storage system 180. The server or storage system 180, in turn, communicates with the domain controller 160 (similar to the conventional case as if the client 110-1 sent the server the negotiate protocol request and the server uses the net logon RPC protocol to communication with the domain controller) to verify that the proxy 140, acting on behalf of the client 110-1, is able to establish the connection 117-1 with the backend server or storage system 180-1. In other words, a server or storage system 180 receiving the challenge response from the proxy 140 verifies the received challenge response by forwarding the encrypted value to the domain controller 160. The domain controller 160 verifies whether the encrypted value forwarded by the server or storage system 180-1 matches the encrypted value that the proxy 140 generated in response to the challenge. If there is a match (e.g., success), the proxy 140 and corresponding client 110-1 is authenticated and the server or storage system 180-1 is allowed to notify (e.g., via an NTLM session setup response) proxy 140 that the connection 117-1 can be established. If there is not a match (e.g., a failure), the server or storage system 180 notifies the proxy 140 that the corresponding client 110-1 has not been authenticated for purposes of establishing connection 117.

The proxy 140 can repeat this above procedure for different challenges on each link to the multiple servers or storage systems 180 in order to establish and authenticate connections 117 with each of the multiple servers or storage system 180. Accordingly, a client 110 can connect to the proxy 140 via a respective first connection 115 and, on behalf of the client 110, the proxy 140 connects to the multiple servers or storage system 180 via a set of multiple second connections 117.

Upon successfully establishing a point-to-multipoint communication topology including connection 115-1, connection 117-1, and connection 117-2, the client 110-1 is cleared to send messages to through proxy 140 to target destinations such as storage system 180-1 and storage system 180-2.

Figure 3:
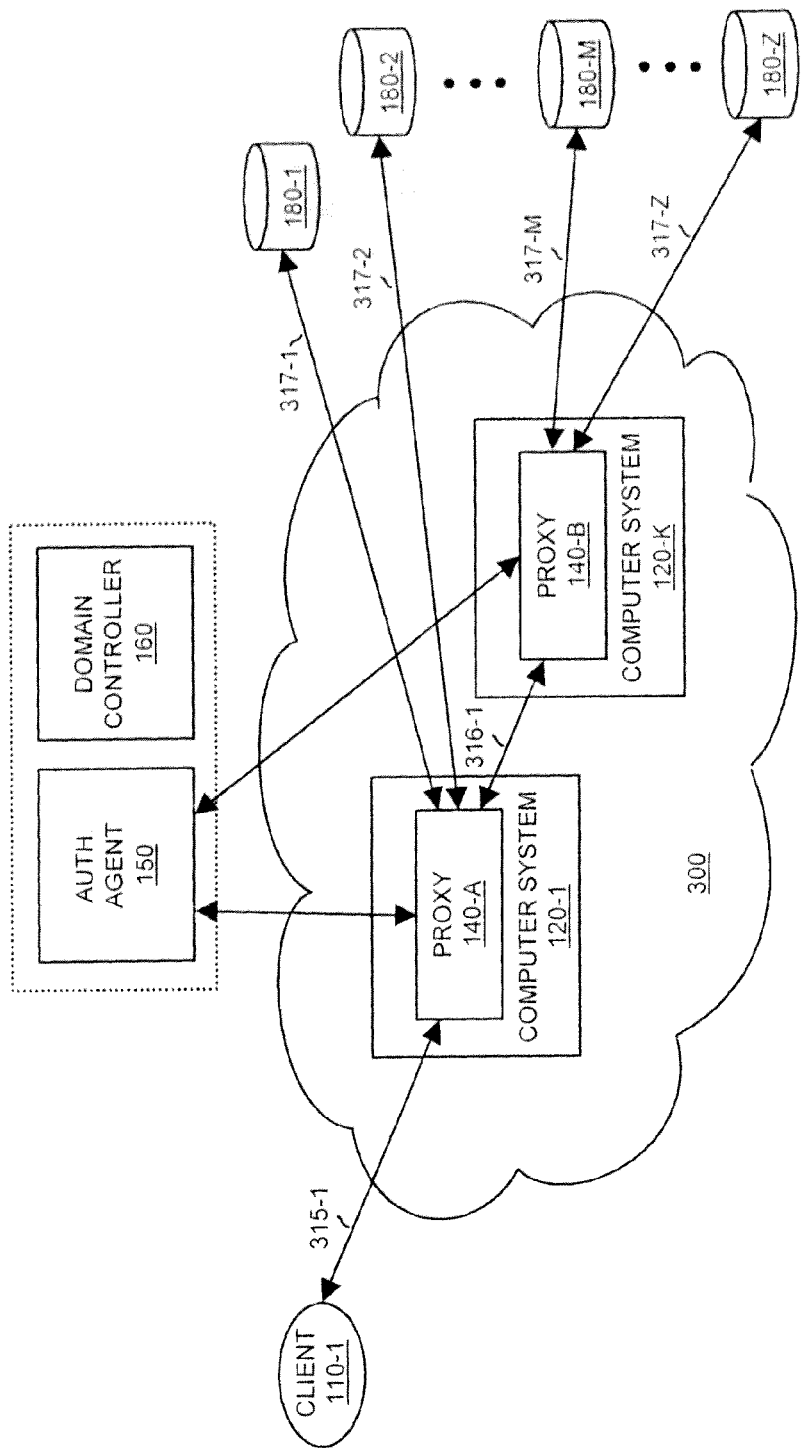
FIG. 3 is a block diagram of a respective network environment including multiple proxies according to an embodiment herein.

FIG. 3 is a block diagram of a network environment 300 including multiple proxies 140 (e.g., proxy 140-A, proxy 140-B, . . . ) according to an embodiment herein. As shown, client 110-1 can communicate through one or more paths including multiple proxies 140 to backend servers or storage systems 180. For example, proxy 140-A authenticates client 110-1 as discussed above in order to establish connection 315-1. Proxy 140-B authenticates client 110-1 as discussed above in order to establish connection 317-1, connection 317-2, connection 317-M, and 317-Z. For authenticating and establishing connection 316-1, proxy 140-B initiates the "create challenge response" procedure discussed above while proxy 140-B initiates the "verification" procedure as discussed above. Note that different switches (e.g., proxies 140 running on the same or different computer platform) may establish a respective communication session with the same agent server. In addition, a single proxy 140 can reference (e.g., establish a connection to) multiple different agent instances present in network environment 100.

Typically, in a multi-domain windows environment, there is at least one agent instance per domain. This allows authentication to support multi-domain type environments.

Figure 4:
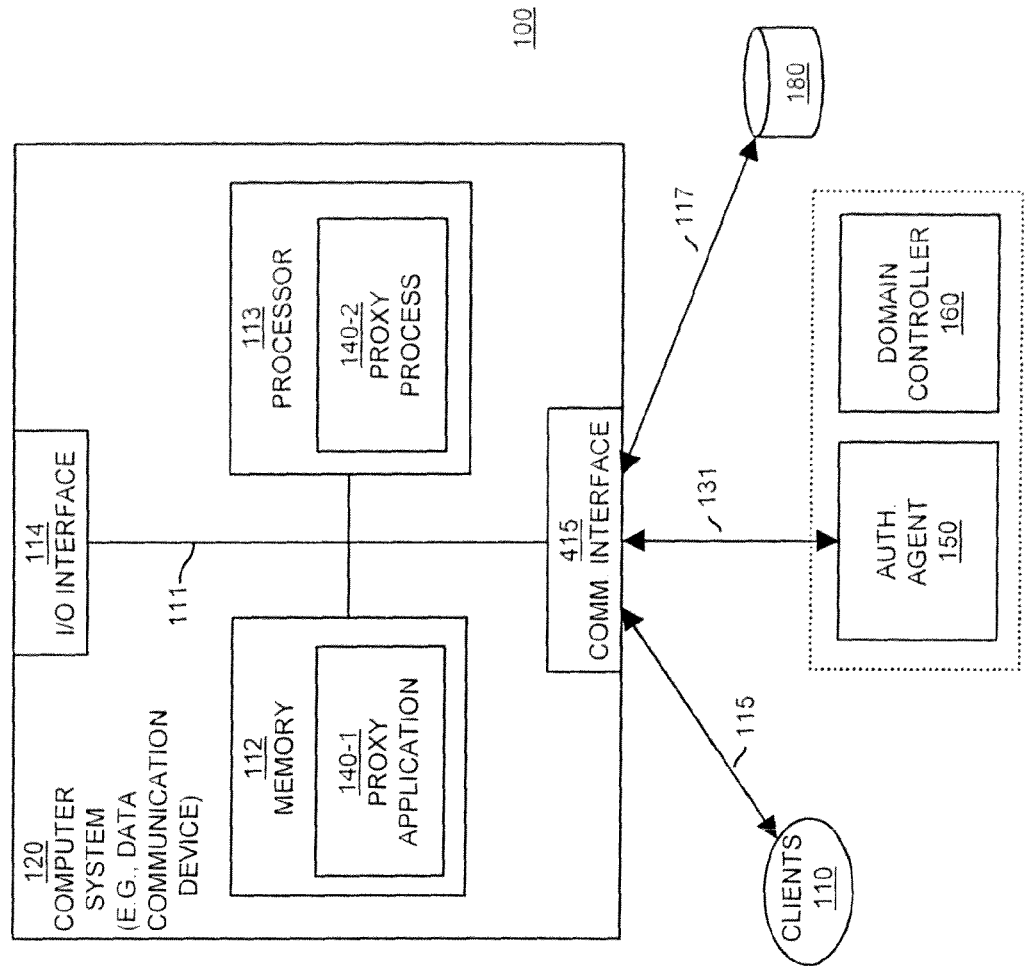
FIG. 4 is a block diagram of an example environment on which to execute a proxy and/or an authentication agent according to embodiments herein.

FIG. 4 is a block diagram illustrating an example architecture of computer system 120 or, more specifically, a data communication device for implementing authentication procedures according to embodiments herein. The authentication agent 150 can operate on a similar type of platform (e.g., computer system 120) executing agent applications, domain controller applications, etc.

Computer system 120 is a computerized device such as a personal computer, workstation, portable computing device, console, network terminal, processing device, router, server, etc. As shown, computer system 120 of the present example includes an interconnect 111 that couples a memory system 112, a processor 113, I/O interface 114, and a communications interface 415. I/O interface 114 potentially provides connectivity to optional peripheral devices such as a keyboard, mouse, display screens, etc. Communications interface 115 enables computer system 120 to establish respective connections 131 to authentication agent 150 for purposes of authenticating connections 115 between clients 110 and computer system 120 as well as connections 117 between computer system 120 and servers 180.

As shown, memory system 112 is encoded with proxy application 140-1 supporting authentication procedures as discussed above and as further discussed below. Proxy application 140-1 may be embodied as software code such as data and/or logic instructions (e.g., code stored in the memory or on another computer readable medium such as a disk) that supports processing functionality according to different embodiments described herein.

During operation, processor 113 accesses memory system 112 via the interconnect 111 in order to launch, run, execute, interpret or otherwise perform the logic instructions of the proxy application 140-1. Execution of the proxy application 140-1 produces processing functionality in proxy process 140-2. In other words, the proxy process 140-2 represents one or more portions of the proxy application 140-1 (or the entire application) performing within or upon the processor 113 in computer system 120. It should be noted that, in addition to proxy process 140-2, embodiments herein include the proxy application 140-1 itself (i.e., the un-executed or nonperforming logic instructions and/or data). The proxy application 140-1 may be stored on a computer readable medium such as a floppy disk, hard disk or in an optical medium. The proxy application 140-1 may also be stored in a memory type system such as in firmware, read only memory (ROM), or, as in this example, as executable code within the memory system 112 (e.g., within Random Access Memory or RAM). In addition to these embodiments, it should also be noted that other embodiments herein include the execution of proxy application 140-1 in processor 113 as proxy process 140-2. Thus, those skilled in the art will understand that the computer system 120 (e.g., a data communication device or computer system) can include other processes and/or software and hardware components, such as an operating system that controls allocation and use of hardware resources.

Functionality supported by computer system 120 and, more particularly, proxy 140 will now be discussed via the flowcharts shown in FIGS. 5-9. For purposes of this discussion, computer system 120, proxy 140, and/or authentication agent 150 generally carry out steps in the flowcharts. However, note that this functionality can be extended to operate on other entities in network environment 100.

Note that the following discussion of flowcharts and corresponding steps may overlap with respect to concepts and techniques discussed above for FIGS. 1 through 4. Also, note that the steps in the below flowcharts need not always be executed in the order shown.

Figure 5:
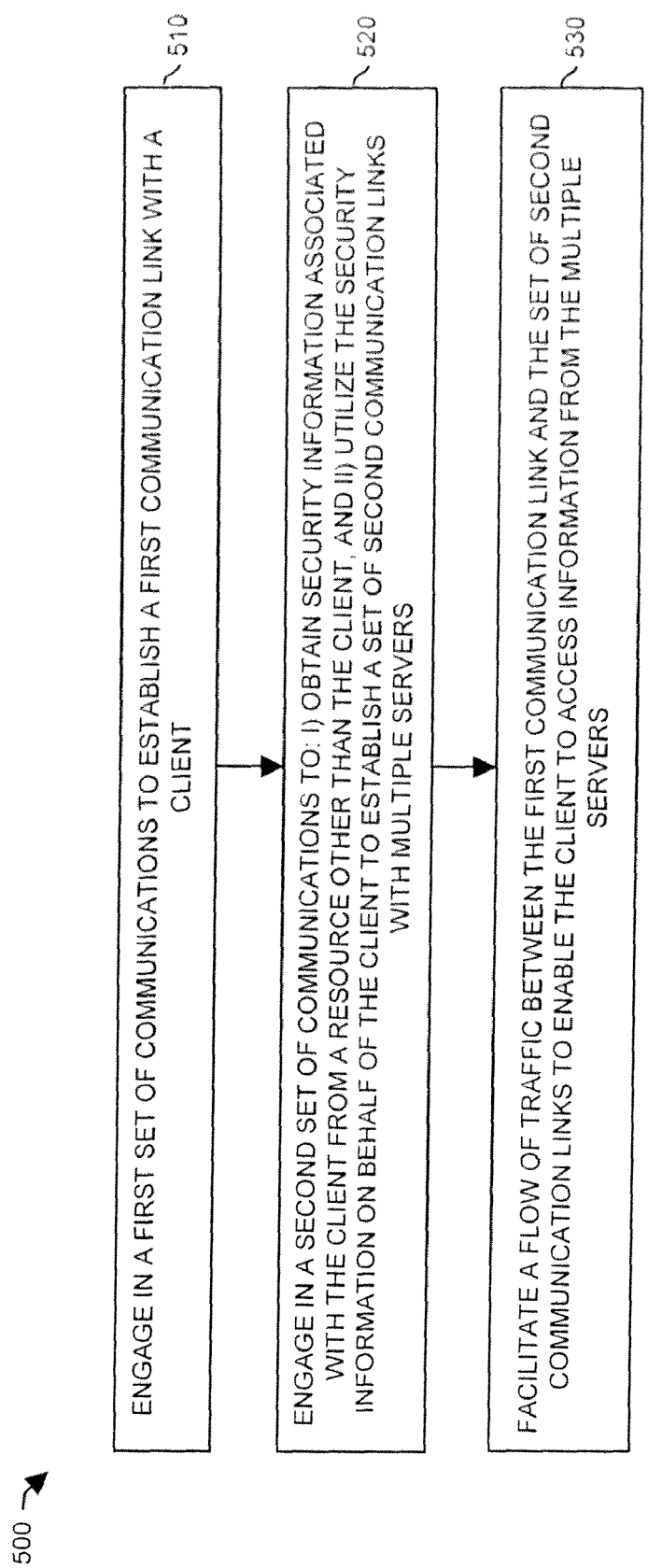
FIG. 5 is a flowchart illustrating a general technique for supporting proxy authentication according to an embodiment herein.

FIG. 5 is a flowchart 500 illustrating a technique of authenticating communication links (e.g., connections 115 and 117) via a proxy 140 and corresponding authentication agent 150 according to embodiments herein. As discussed, one purpose of utilizing proxy 140 is to manage distributed data at a central location and facilitate a corresponding flow of data traffic through computer system 120 in lieu of requiring that each respective client manage data flows with the backend servers. Authentication agent 150 enables the proxy 140 to authenticate clients and ensure that connections are properly established on behalf of the clients 110 for purposes of accessing backend servers through the proxy 140.

In step 510, proxy 140 engages in a first set of communications to establish a first type (e.g., a client-proxy type connection) of communication link (i.e., connection 115) with a respective client 110-1. The first type of communication link connects the client 110-1 to the proxy 140.

In step 520, proxy 140 engages in a second set of communications to: i) obtain security information (e.g., password hash key information) associated with the client 110-1 from a resource (e.g., authentication agent 150) other than the client 110-1, and ii) utilize the security information on behalf of the client 110-1 to establish a set of second type (e.g., a proxy-server type of connection) of communication links with the multiple servers (e.g., storage systems 180). In other words, the proxy 140 engages the authentication agent 150 to obtain and utilize a password hash key associated with the client 110-1 for purposes of establishing the connection 117-1 between the proxy 140 and a respective server. As discussed above, one use of the password hash key is to generate a challenge response for the proxy 140. Although embodiments can vary, according to a particular embodiment herein, the authentication agent 150 does not send the password hash over connection 131 between the authentication agent 150 and the proxy 140 for security purposes. If the password hash were passed over connection 131, the security model according to embodiments herein, may become questionable. However, note that in certain applications, sending the password hash value between the authentication agent and the proxy 140 may be acceptable.

In step 530, proxy 140 facilitates a flow of data traffic between the first communication link (e.g., connection 115-1) and the set of second communication links (e.g., connection 117-1 and connection 117-2) to enable the client 110-1 to access information from multiple servers.

Figure 6:
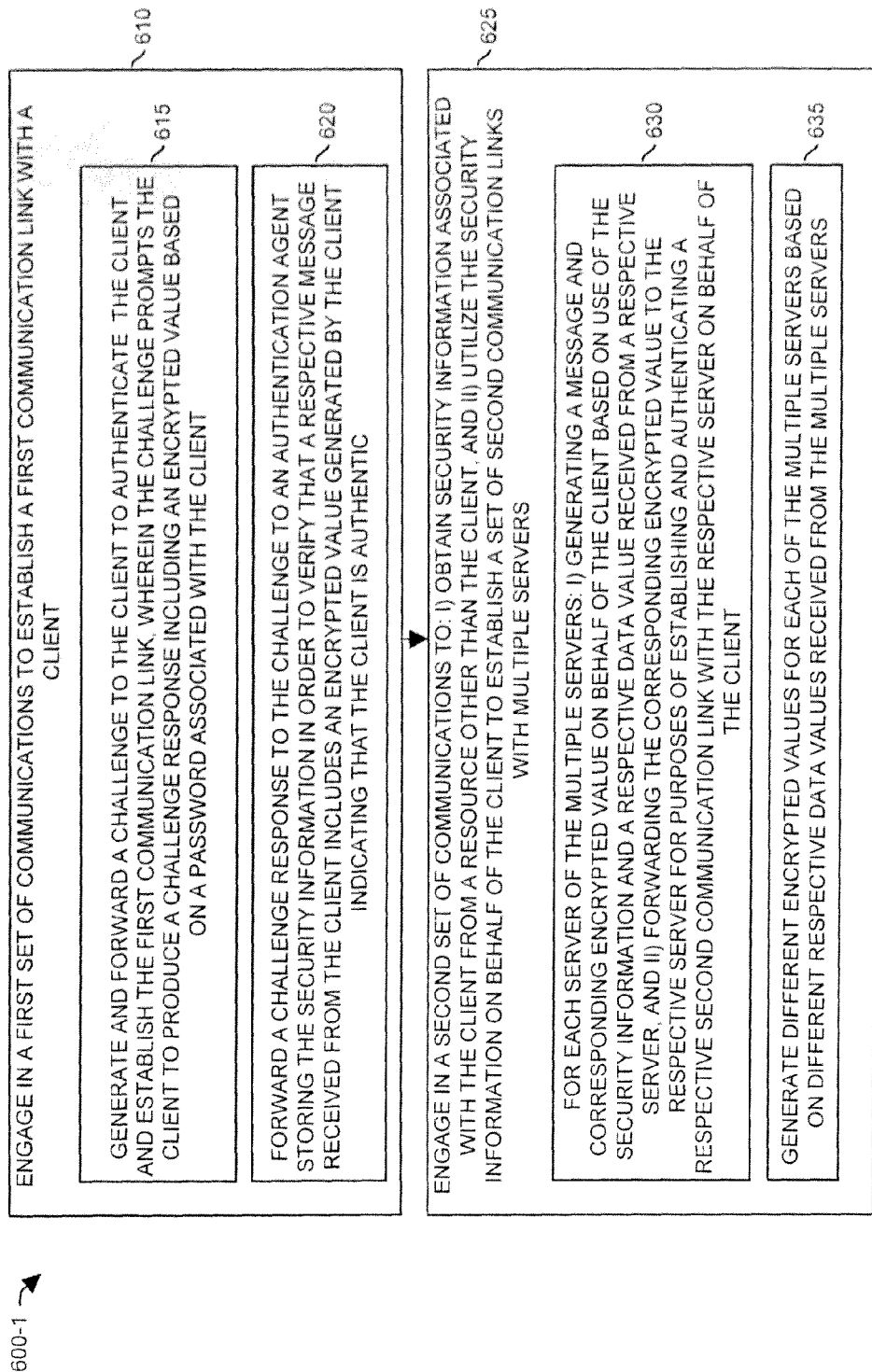
FIGS. 6 and 7 combine to form a flowchart illustrating more specific techniques for supporting proxy authentication according to an embodiment herein.
Figure 7:
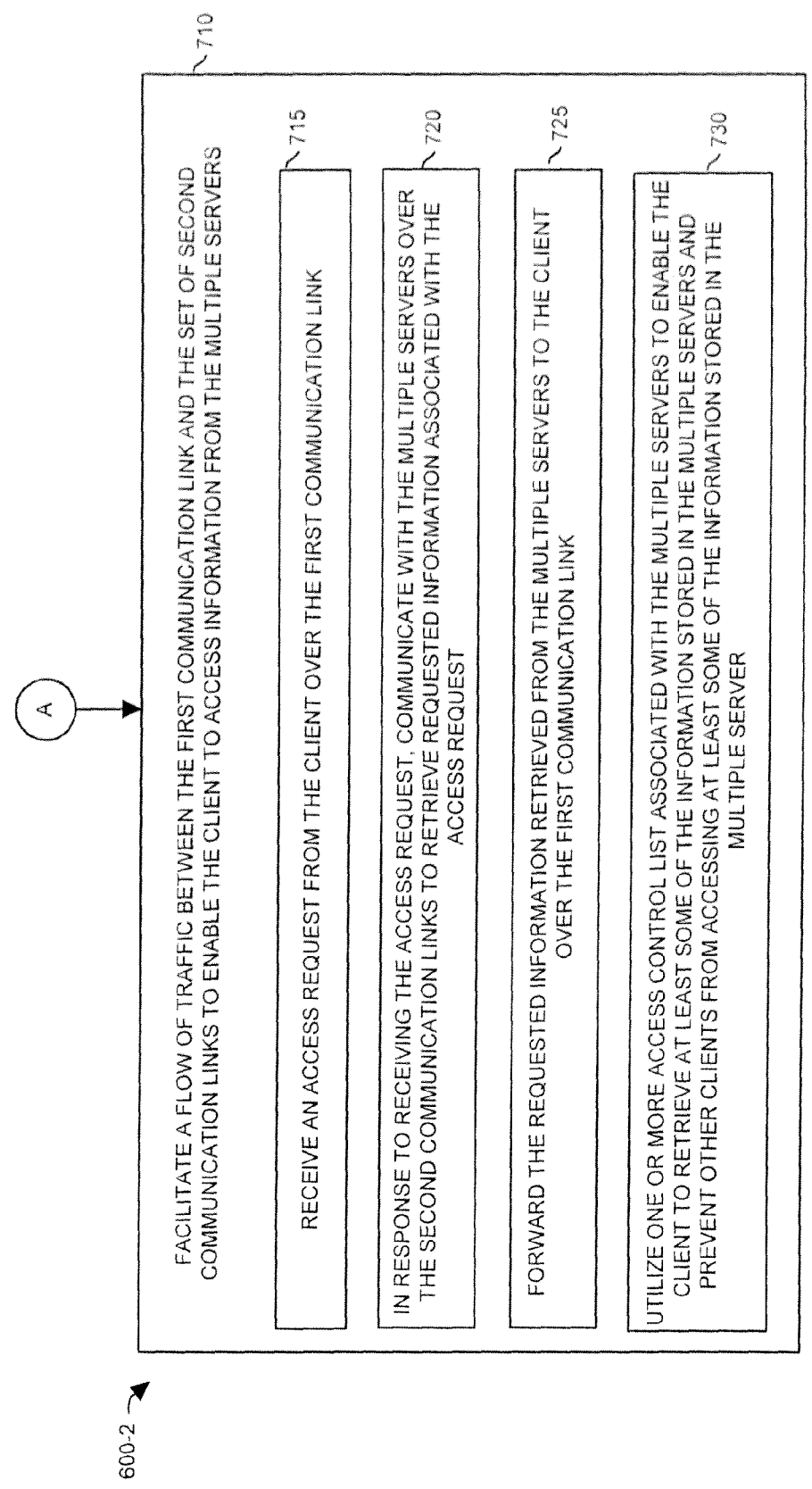

FIGS. 6 and 7 combine to form a flowchart 600 (e.g., flowchart 600-1 and flow chart 600-2) illustrating more specific techniques for carrying out authentication techniques according to embodiments herein.

In step 610 of flowchart 600-1 of FIG. 6, proxy 140 engages in a first set of communications to establish a first communication link (e.g., connection 115-1) with client 110-1.

In sub-step 615 of step 610, the proxy 140 forwards a challenge to the client 110-1 for purposes of authenticating that the client is authorized to establish the first communication link (e.g., connection 115-1). As discussed above, the challenge is a request generated by a proxy 140 for the client 110-1 to produce an encrypted value (e.g., challenge response) based on a proper password associated with the client. In one embodiment, the challenge includes an 8-byte value generated by the authentication agent 150 or proxy 140.

In sub-step 615 of step 610, the proxy 140 receives a challenge response from the client 110-1 and forwards the challenge response to an authentication agent 150 that stores security information (e.g., username and password information) retrieved from a domain controller 160 in order to verify that a respective message received from the client 110-1 includes an encrypted value generated by the client 110-1 indicating that the client 110-1 is authentic. In other words, the authentication agent checks whether a user at client 110-1 provides the appropriate response for a respective username.

In step 625, proxy 140 engages in a second set of communications to utilize security information (e.g., password hash key information) associated with the client 110-1 from a resource (e.g., authentication agent 150) other than the client 110-1 for purposes of establishing a set of second communication links (e.g., connections 117) with multiple servers or storage systems 180 on behalf of the client 110-1.

In sub-step 630 of step 625, for each server (or storage system 180) of the multiple servers (of storage systems 180), the proxy 140 communicates with the authentication agent 150 to: i) generate a message and corresponding encrypted value (e.g., a challenge response) based on use of the security information and a respective data value (e.g., 8-byte challenge value) received from a respective server. The proxy 140 receives and forwards the corresponding encrypted value (e.g., challenge response) received from the authentication agent 150 to the respective server for purposes of establishing and authenticating a respective second communication link (e.g., connection 117) with the respective server or storage system 180 on behalf of the client 110-1.

In sub-step 635 of step 625, the authentication agent 150 generates different encrypted values (e.g., challenge responses) depending on challenge values received from different servers. The proxy 140 forwards the different challenge responses generated by the authentication agent 150 to the respective servers or storage systems 180.

In step 710 of flowchart 600-2 of FIG. 7, proxy 140 facilitates a flow of data traffic amongst the first communication link (e.g., connection 115-1) and the set of second communication links (e.g., connections 117-1 and 117-2) to enable the client 110-1 to access information from the multiple servers or storage systems 180.

In sub-step 715 of step 710, the proxy 140 receives an access request from the client 110-1 over the first communication link (e.g., connection 115-1).

In sub-step 720 of step 710, in response to receiving the access request, the proxy 140 communicates with the multiple servers or storage systems 180 over one or more of the second communication links (e.g., connections 117-1 and 117-2) to retrieve requested information associated with the access request.

In sub-step 725 of step 710, the proxy 140 forwards the requested information retrieved from the multiple servers or storage system 180 to the client 110-1 over the first communication link (e.g., connection 115-1).

In sub-step 730 of step 710, the servers or storage systems 180 utilize one or more respective access controls list to enable the client (or clients) to retrieve information stored in the multiple servers or storage systems 180. The access control lists can be used to prevent other clients from accessing at least some of the information stored in the multiple servers or storage systems 180.

Figure 8:
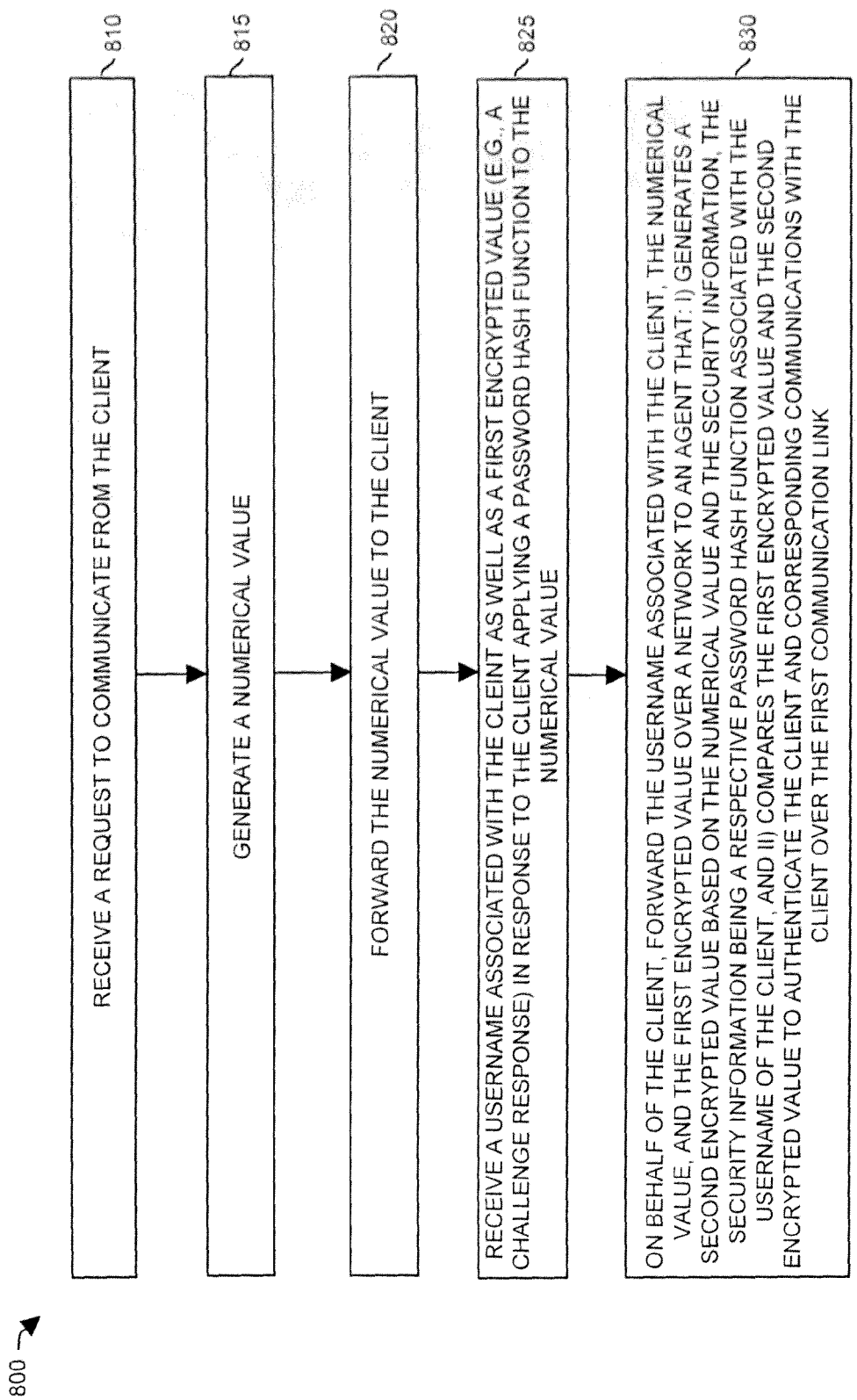
FIG. 8 is a flowchart illustrating a technique of verifying a challenge response from a client via use of a remote authentication agent according to an embodiment herein.

FIG. 8 is a flowchart 800 illustrating more specific techniques for verifying authentication of a client at proxy 140 according to an embodiment herein.

In step 810, the proxy 140 receives a request to communicate from the client 110-1.

In step 815, the proxy 140 generates a numerical value (e.g., an 8-byte challenge value). Note also that authentication agent 150 can alternatively generate an 8-byte challenge value to the proxy 140 that in turn forwards the challenge value to the client 110-1.

In step 820, the proxy 140 forwards the numerical value (e.g., challenge value) to the client 110-1.

In step 825, the proxy 140 receives a username and a first encrypted value (e.g., a challenge response from the client 110-1) which is generated based on the client 110-1 applying a password hash function or key to the numerical challenge value.

In step 830, the proxy 140 forwards the username associated with the client 110-1, the numerical value (e.g., challenge value), and the first encrypted value (e.g., the challenge response received from the client 110-1) over a network connection 131 to an authentication agent 150 that: i) generates a second encrypted value (e.g., an expected challenge response) based on the numerical value and security information such as a respective password hash function associated with the username of the client 110-1, and ii) compares the first encrypted value (e.g., actual challenge response received from the client 110-1) and the second encrypted value (e.g., an expected challenge response that should have been received from the client 110-1) to authenticate the client 110-1 and corresponding communications with the client 110-1 over the first communication link (e.g., connection 115-1).

Figure 9:
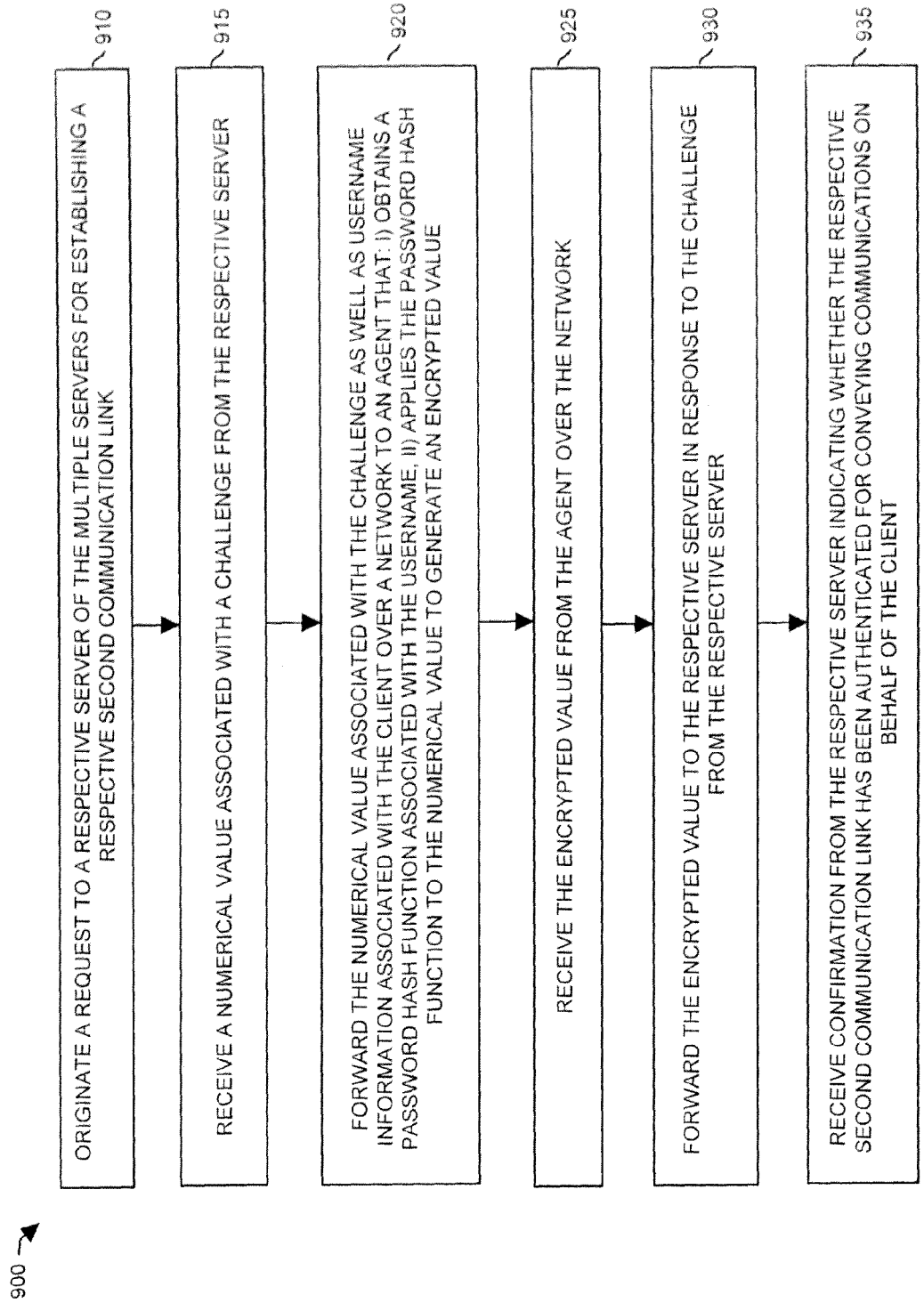
FIG. 9 is a flowchart illustrating a technique of generating a challenge response at a respective remote authentication agent on behalf of a client according to an embodiment herein.

FIG. 9 is a flowchart 900 illustrating more specific techniques for creating challenge responses on behalf of a client according to an embodiment herein. As discussed above, the following routine can be performed for each of multiple servers or storage systems 180.

In step 910, the proxy 140 originates a request to a respective server or storage system 180 for establishing a respective second type of communication link such as a connection 117.

In step 915, the proxy 140 receives a numerical value associated with a challenge from the respective server or storage system 180. The challenge from the server or storage system 180 is received in response to the proxy 140 sending a request session message to the respective server of storage system 180.

In step 920, the proxy 140 forwards the numerical value (e.g., randomly generated 8-byte unique value) associated with the challenge as well as username information associated with the client over connection 131 of network environment 100 to authentication agent 150 that: i) obtains a password hash function associated with the username, and ii) applies the password hash function to the numerical value to generate an encrypted value (e.g., challenge response).

In step 925, the proxy 140 receives the encrypted value (e.g., challenge response) from the authentication agent 150 over connection 131. Accordingly, authentication agent 150 generates the response on behalf of the client.

In step 935, the proxy 140 forwards the encrypted value (e.g., challenge response) to the respective server or storage system 180 as a response to the challenge from the respective server or storage system 180.

In step 935, the proxy 140 receives confirmation from the respective server or storage system 180 indicating whether the respective second communication link (e.g., connection 117) and/or corresponding client has been authenticated for conveying futures communications on behalf of the client.

Note again that techniques herein are well suited for use in applications in which a proxy and authentication agent 150 handle authentication on behalf of a client to support point-to-multipoint type of communications in a respective network environment. For example, in the context of HTTP web services, an authenticated client can communicate with multiple servers (e.g., storage systems) through the proxy. Although the embodiments herein, at times, indicate a specific use and configuration, it should again be noted that configurations herein are not limited to use in such applications and thus configurations herein and deviations thereof are well suited for other applications as well. Thus, while this invention has been particularly shown and described with references to preferred embodiments thereof, it will be understood by those skilled in the art that various changes in form and details may be made therein without departing from the spirit and scope of the invention as defined by the appended claims. For example, the above techniques are not limited to 2-tiers. It is possible, for example, to deploy several tiers of proxies to produce a client-proxy1-proxy-2-server connection. Also, note that each tier can include several proxy devices.

What is claimed is:

1. A method for authenticating communications in a network environment, the method comprising:

engaging, with a proxy device, in a first set of communications to establish a first communication link with a client, the first set of communications comprising sending to the client a first challenge, obtaining from the client a first challenge response, sending the first challenge response to a resource independent of the client, and receiving a notification from the resource that the client has been authenticated, the notification generated using security information associated with the client;

engaging, with the proxy device, in a second set of communications to establish a set of second communication links with multiple servers on behalf of the client, the second set of communications comprising receiving a second challenge from each of the servers, sending the second challenges to the resource, receiving a second challenge response for each of the servers from the resource, each of the second challenge responses generated using a respective one of the second challenges and the security information, and forwarding a respective one of the second challenge responses to each of the servers; and facilitating, with the proxy device, a flow of traffic between the first communication link and the set of second communication links to enable the client to access information from the multiple servers.

2. A method as in claim 1, wherein the engaging in the first set of communications and the second set of communications includes propagating an identity of the client to the multiple servers via an authentication process used to establish the second set of communication links with the multiple servers on behalf of the client, wherein the security information includes the identity of the client.

3. A method as in claim 1, wherein engaging in the first set of communications and the second set of communications occurs in response to the client attempting to mount a respective file system supported by the multiple servers.

4. A method as in claim 1, wherein the first challenge is a request generated by the proxy device on behalf of the multiple servers for the client to produce an encrypted value based on a proper password associated with the client, wherein the challenge response includes the encrypted value.

5. A method as in claim 1, wherein the engaging in the second set of communications includes:
receiving a unique value from each of the multiple servers, wherein each of the second challenges includes one of the unique values; and
replying to multiple unique values from the multiple servers with a different one of the second challenge responses on behalf of the client.

6. A method as in claim 1, wherein the resource is an authentication agent and the security information associated with the client is obtained from a domain controller associated with the network environment, the method further comprising:
enabling, with the proxy device, the agent to obtain a memory dump from the domain controller associated with the network environment, the memory dump including security information comprising username information and corresponding password encryption key information for each of multiple clients authorized to communicate with the multiple servers; and
initiating, with the proxy device, the agent to authenticate the client based on respective username information associated with the client retrieved from the memory dump and applying a respective password encryption key associated with the respective username information to a numerical value included in the first challenge.

7. A method as in claim 1 wherein the facilitating the flow of traffic further comprises utilizing at least one access control list associated with the multiple servers to enable the client to retrieve at least some of the information stored in the multiple servers and prevent other clients from accessing at least some of the information stored in the multiple servers.

8. A method as in claim 1, wherein the facilitating the flow of traffic comprises:
managing how information is stored in the multiple servers; and
providing the client a unified view of accessible information stored in the multiple servers.

9. A proxy device, comprising:
one or more processors, a network interface controller, and a memory, at least one of the processors or the network interface controller configured to be capable of executing instructions to implement:
engaging in a first set of communications to establish a first communication link with a client, the first set of communications comprising sending to the client a first challenge, obtaining from the client a first challenge response, sending the first challenge response to a resource independent of the client, and receiving a notification from the resource that the client has been authenticated, the notification generated using security information associated with the client;
engaging in a second set of communications to establish a set of second communication links with multiple servers on behalf of the client, the second set of communications comprising receiving a second challenge from each of the servers, sending the second challenges to the resource, receiving a second challenge response for each of the servers from the resource, each of the second challenge responses generated using a respective one of the second challenges and the security information, and forwarding a respective one of the second challenge responses to each of the servers; and
facilitating a flow of traffic between the first communication link and the set of second communication links to enable the client to access information from the multiple servers.

10. A proxy device as in claim 9, wherein the engaging in the first set of communications and the second set of communications includes propagating an identity of the client to the multiple servers via an authentication process used to establish the second set of communication links with the multiple servers on behalf of the client, wherein the security information includes the identity of the client.

11. A proxy device as in claim 9, wherein the engaging in the first set of communications and the second set of communications occurs in response to the client attempting to mount a respective file system supported by the multiple servers.

12. A proxy device as in claim 9, wherein the first challenge is a request generated on behalf of the multiple servers for the client to produce an encrypted value based on a proper password associated with the client, wherein the challenge response includes the encrypted value.

13. A proxy device as in claim 9, wherein the engaging in the second set of communications includes:
receiving a unique value from each of the multiple servers, wherein each of the second challenges includes one of the unique values; and
replying to multiple unique values from the multiple servers with a different one of the second challenge responses on behalf of the client.

14. A proxy device as in claim 9, wherein the resource is an authentication agent and the security information associated with the client is obtained from a domain controller associated with the network environment and the at least one of the processors or the network interface controller is further configured to be capable of executing instructions to implement:
enabling the agent to obtain a memory dump from the domain controller associated with the network environment, the memory dump including security information comprising username information and corresponding password encryption key information for each of multiple clients authorized to communicate with the multiple servers; and
initiating the agent to authenticate the client based on respective username information associated with the client retrieved from the memory dump and applying a respective password encryption key associated with the respective username information to a numerical value included in the first challenge.

15. A proxy device as in claim 9, wherein the facilitating the flow of traffic further comprises utilizing at least one access control list associated with the multiple servers to enable the client to retrieve at least some of the information stored in the multiple servers and prevent other clients from accessing at least some of the information stored in the multiple servers.

16. A proxy device as in claim 9, wherein the facilitating the flow of traffic includes:
managing how information is stored in the multiple servers; and
providing the client a unified view of accessible information stored in the multiple servers.

17. A non-transitory computer readable medium having instructions stored thereon for authenticating communications in a network environment comprising machine executable code which when executed by a processing device, causes the processing device to perform steps comprising:
engaging in a first set of communications to establish a first communication link with a client, the first set of communications comprising sending to the client a first challenge, obtaining from the client a first challenge response, sending the first challenge response to a resource independent of the client, and receiving a notification from the resource that the client has been authenticated, the notification generated using security information associated with the client;
engaging in a second set of communications to establish a set of second communication links with multiple servers on behalf of the client, the second set of communications comprising receiving a second challenge from each of the servers, sending the second challenges to the resource, receiving a second challenge response for each of the servers from the resource, each of the second challenge responses generated using a respective one of the second challenges and the security information, forwarding a respective one of the challenge responses to each of the servers;
facilitating a flow of traffic between the first communication link and the set of second communication links to enable the client to access information from the multiple servers.

18. The computer readable medium as in claim 17, wherein the engaging in the first set of communications and the second set of communications includes propagating an identity of the client to the multiple servers via an authentication process used to establish the second set of communication links with the multiple servers on behalf of the client, wherein the security information includes the identity of the client.

19. The computer readable medium as in claim 17, wherein the engaging in the first set of communications and the second set of communications occurs in response to the client attempting to mount a respective file system supported by the multiple servers.

20. The computer readable medium as in claim 17, wherein the first challenge is a request generated on behalf of the multiple servers for the client to produce an encrypted value based on a proper password associated with the client, wherein the challenge response includes the encrypted value.

21. The computer readable medium as in claim 17, wherein the engaging in the second set of communications further comprises:
receiving a unique value from each of the multiple servers, wherein each of the second challenges includes one of the unique values; and
replying to multiple unique values from the multiple servers with a different one of the second challenge responses on behalf of the client.

22. The computer readable medium as in claim 17, wherein the resource is an authentication agent and the security information associated with the client is obtained from a domain controller associated with the network environment, the medium further having stored thereon machine executable code which when executed by a processing device, causes the processing device to perform steps further comprising
enabling the agent to obtain a memory dump from the domain controller associated with the network environment, the memory dump including security information comprising username information and corresponding password encryption key information for each of multiple clients authorized to communicate with the multiple servers; and
initiating the agent to authenticate the client based on respective username information associated with the client retrieved from the memory dump and applying a respective password encryption key associated with the respective username information to a numerical value included in the first challenge.

23. The computer readable medium as in claim 17, wherein the facilitating the flow of traffic further comprises utilizing at least one access control list associated with the multiple servers to enable the client to retrieve at least some of the information stored in the multiple servers and prevent other clients from accessing at least some of the information stored in the multiple servers.

24. The computer readable medium as in claim 17, wherein the facilitating the flow of traffic further comprises:
managing how information is stored in the multiple servers; and
providing the client a unified view of accessible information stored in the multiple servers.

25. A system for authenticating communications in a network environment, the system comprising:
a plurality of servers, a resource device, and a proxy device, the proxy device comprises one or more processors, a network interface controller configured to communicate with the plurality of servers and the resource device, and a memory, at least one of the processors or the network interface controller configured to implement:
engaging in a first set of communications to establish a first communication link with a client, the first set of communications comprising sending to the client a first challenge, obtaining from the client a first challenge response, sending the first challenge response to the resource device, the resource device independent of the client, and receiving a notification from the resource device that the client has been authenticated, the notification generated using security information associated with the client;
engaging in a second set of communications to establish a set of second communication links with the servers on behalf of the client, the second set of communications comprising receiving a second challenge from each of the servers, sending the second challenges to the resource device, receiving a second challenge response for each of the servers from the resource device, each of the second challenge responses generated using a respective one of the second challenges and the security information, and forwarding a respective one of the second challenge responses to each of the servers; and facilitating a flow of traffic between the first communication link and the set of second communication links to enable the client to access information from the servers.

26. The system as in claim 25, wherein the engaging in the first set of communications and the second set of communications includes propagating an identity of the client to the multiple servers via an authentication process used to establish the second set of communication links with the multiple servers on behalf of the client, wherein the security information includes the identity of the client.

27. The system as in claim 25, wherein the engaging in the first set of communications and the second set of communications occurs in response to the client attempting to mount a respective file system supported by the multiple servers.

28. The system as in claim 25, wherein the first challenge is a request generated on behalf of the multiple servers for the client to produce an encrypted value based on a proper password associated with the client, wherein the challenge response includes the encrypted value.

29. The system as in claim 25, wherein the engaging in the second set of communications further comprises:
   receiving a unique value from each of the multiple servers, wherein each of the second challenges includes one of the unique values; and
   replying to multiple unique values from the multiple servers with a different one of the second challenge responses on behalf of the client.

30. The system as in claim 25, further comprising a domain controller and wherein the resource device is an authentication agent and the security information associated with the client is obtained from the domain controller, the medium further having stored thereon machine executable code which when executed by a processing device, causes the processing device to perform steps further comprising
   enabling the agent to obtain a memory dump from the domain controller associated with the network environment, the memory dump including security information comprising username information and corresponding password encryption key information for each of multiple clients authorized to communicate with the multiple servers; and
   initiating the agent to authenticate the client based on respective username information associated with the client retrieved from the memory dump and applying a respective password encryption key associated with the respective username information to a numerical value included in the first challenge.

31. The system as in claim 25, wherein the facilitating the flow of traffic further comprises utilizing at least one access control list associated with the multiple servers to enable the client to retrieve at least some of the information stored in the multiple servers and prevent other clients from accessing at least some of the information stored in the multiple servers.

32. The system as in claim 25, wherein the facilitating the flow of traffic further comprises:
   managing how information is stored in the multiple servers; and
   providing the client a unified view of accessible information stored in the multiple servers.

* * * * *